(12) United States Patent
Calapodescu et al.

(10) Patent No.: US 12,361,926 B2
(45) Date of Patent: Jul. 15, 2025

(54) END-TO-END NEURAL TEXT-TO-SPEECH MODEL WITH PROSODY CONTROL

(71) Applicant: NAVER CORPORATION, Seongnam-si (KR)

(72) Inventors: Ioan Calapodescu, Grenoble (FR); Inyoung Kim, Meylan (FR); Laurent Besacier, Seyssinet Pariset (FR); Siddique Latif, Queensland (AU)

(73) Assignee: NAVER CORPORATION, Seongnam-si (KR)

( * ) Notice: Subject to any disclaimer, the term of this patent is extended or adjusted under 35 U.S.C. 154(b) by 217 days.

(21) Appl. No.: 17/934,836

(22) Filed: Sep. 23, 2022

(65) Prior Publication Data

US 2023/0215421 A1 Jul. 6, 2023

Related U.S. Application Data

(60) Provisional application No. 63/266,215, filed on Dec. 30, 2021.

(51) Int. Cl.
| | |
|---|---|
| G10L 13/047 | (2013.01) |
| G06F 40/169 | (2020.01) |
| G06F 40/237 | (2020.01) |
| G06F 40/284 | (2020.01) |
| G10L 13/10 | (2013.01) |

(52) U.S. Cl.
CPC ............ *G10L 13/10* (2013.01); *G06F 40/169* (2020.01); *G06F 40/237* (2020.01); *G06F 40/284* (2020.01); *G10L 13/047* (2013.01); *G10L 2013/105* (2013.01)

(58) Field of Classification Search
CPC ..... G10L 13/047; G10L 13/10; G10L 13/027; G10L 13/02; G10L 13/08; G10L 13/0335; G10L 13/07; G10L 17/18; G10L 21/013; G06N 3/044; G06N 3/084; G06N 3/047; G06N 3/045; G06N 3/088; G06N 3/08
See application file for complete search history.

(56) References Cited

U.S. PATENT DOCUMENTS

| | | | |
|---|---|---|---|
| 8,886,538 B2 * | 11/2014 | Aaron ................... | G10L 13/10 704/E13.011 |
| 9,286,886 B2 * | 3/2016 | Minnis .................. | G10L 13/10 |
| 9,959,270 B2 * | 5/2018 | Yassa ................... | G06F 40/253 |

(Continued)

OTHER PUBLICATIONS

Agüero, P., et al., "Prosody Generation for Speech-to-Speech Translation," 2006 IEEE International Conference on Acoustics Speed and Signal Processing Proceedings, 1, Toulouse, France, 2006, pp. 1-557-1-560.

(Continued)

*Primary Examiner* — Vijay B Chawan
(74) *Attorney, Agent, or Firm* — Greer, Burns & Crain, Ltd

(57) ABSTRACT

Methods and systems for generating an end-to-end neural text-to-speech (TTS) model to process an input text to generate speech representations. An annotated set of text documents including annotations inserted therein to indicate prosodic features are input into the TTS model. The TTS model is trained using the annotated dataset and a corresponding dataset of speech representations of the text documents that include prosody associated with the indicated prosodic features. The trained TTS model learns to associate the prosody with the annotations.

36 Claims, 18 Drawing Sheets

(56) References Cited

U.S. PATENT DOCUMENTS

| | | | |
|---|---|---|---|
| 11,514,888 B2* | 11/2022 | Finkelstein | G10L 13/02 |
| 2007/0055526 A1* | 3/2007 | Eide | G10L 13/10 |
| | | | 704/260 |
| 2010/0082326 A1* | 4/2010 | Bangalore | G10L 13/10 |
| | | | 704/3 |
| 2012/0191457 A1* | 7/2012 | Minnis | G10L 13/10 |
| | | | 704/E13.011 |
| 2020/0211529 A1* | 7/2020 | Pollet | G10L 13/07 |
| 2022/0051654 A1* | 2/2022 | Finkelstein | G06N 3/045 |
| 2022/0189455 A1* | 6/2022 | Pekar | G10L 13/02 |

OTHER PUBLICATIONS

Anumanchipalli, G., et al., "Intent Transfer in Speech-to-Speech Machine Translation," 2012 IEEE Spoken Language Technology Workshop (SLT), Miami, FL, USA, 2012, pp. 153-158.

Bérard, A., et al., "Naver Labs Europe's Systems for the WMT19 Machine Translation Robustness Task," published on arXiv as 190706488, Jul. 15, 2019, 7 pages.

Breen, M., et al., "Acoustic Correlates of Information Structure," Language and Cognitive Processes 25.7, No. 7-9, Sep. 2010, pp. 1044-1098.

Devlin, J., et al., "BERT: Pre-Training of Deep Bidirectional Transformers for Language Understanding," published on arXiv as 181004805, May 24, 2019, 16 pages.

Do, Q., et al., "Preserving Word-Level Emphasis in Speech-to-Speech Translation Using Linear Regression HSMMs," Interspeech 2015, Sep. 6-10, 2015, Dresden, Germany, pp. 3665-3669.

Habib, R., et al., "Semi-Supervised Generative Modeling for Controllable Speech Synthesis," published on arXiv as 191001709, Oct. 3, 2019, 13 pages.

Hamza, W., et al., "The IBM Expressive Speech Synthesis System," Interspeech 2004, ISCA, 2004, pp. 2577-2580.

Kobus, C., et al., "Domain Control for Neural Machine Translation," published on arXiv as 161206140, Sep. 12, 2017, 7 pages.

Łańcucki, A., "FastPitch: Parallel Text-to-Speech with Pitch Prediction," published on arXiv as 200606873, Feb. 16, 2021, 5 pages.

Latif, S., et al., "Controlling Prosody in End-to-End TTS: A Case Study on Contrastive Focus Generation," Proceedings of the 25th Conference on Computational Natural Language Learning, Online: Association for Computational Linguistics, Nov. 10-11, 2021, pp. 544-551.

Lee, Y., et al., "Robust and Fine-Grained Prosody Control of End-to-End Speech Synthesis," published on arXiv as 181102122, Feb. 18, 2019, 5 pages.

Lim, D., et al., "JDI-T: Jointly Trained Duration Informed Transformer for Text-To-Speech without Explicit Alignment," published on arXiv as 200507799, Oct. 5, 2020, 5 pages.

Massey, F., "The Kolmogorov-Smirnov Test for Goodness of Fit," Journal of the American Statistical Association 46, No. 253, Mar. 1951, pp. 68-78.

McAuliffe, M., et al., "Montreal Forced Aligner: Trainable Text-Speech Alignment Using Kaldi," Interspeech 2017, ISCA, Aug. 20-24, 2017, pp. 498-502.

Morrison, M., et al., "Controllable Neural Prosody Synthesis," Interspeech 2020, ISCA, Oct. 25-29, 2020, pp. 4437-4441.

Ping, W., et al., "Deep Voice 3: Scaling Text-to-Speech with Convolutional Sequence Learning," published on arXiv as 171007654, Feb. 22, 2018, 16 pages.

Pitrelli, J., et al., "The IBM Expressive Text-to-Speech Synthesis System for American English," IEEE Transactions on Audio, Speech and Language Processing 14, No. 4, Jul. 2006, pp. 1099-1108.

Prenger, R., et al., "WaveGlow: A Flow-Based Generative Network for Speech Synthesis," published on arXiv as 181100002, Oct. 31, 2018, 5 pages.

Ren, Y., et al., "FastSpeech 2: Fast and High-Quality End-to-End Text to Speech," published on arXiv as 200604558, Oct. 16, 2020, 14 pages.

Ren, Y., et al., "FastSpeech: Fast, Robust and Controllable Text to Speech," published on arXiv as 190509263, Nov. 20, 2019, 13 pages.

Roettger, T., et al., "Mapping Prosody onto Meaning—the Case of Information Structure in American English," Language, Cognition and Neuroscience, vol. 34, No. 7, 2019, pp. 841-860.

Rooth, M., "A Theory of Focus Interpretation," Natural Language Semantics 1, No. 1, Feb. 1992, 42 pages.

Sakoe, H., et al., "Dynamic Programming Algorithm Optimization for Spoken Word Recognition," IEEE Transactions on Acoustics, Speech, and Signal Processing, vol. ASSP-26, No. 1, Feb. 1978, pp. 43-49.

Shechtman, S., et al., "Supervised and Unsupervised Approaches for Controlling Narrow Lexical Focus in Sequence-to-Sequence Speech Synthesis," 2021 IEEE Spoken Language Technology Workshop (SLT), 2021, pp. 431-437.

Shen, J., et al., "Natural TTS Synthesis by Conditioning WaveNet on Mel Spectrogram Predictions," published on arXiv.1712.05884v2, Feb. 16, 2018, 5 pages.

Skerry-Ryan, RJ, et al., "Towards End-to-End Prosody Transfer for Expressive Speech Synthesis with Tacotron," published on arXiv as 180309047, Mar. 24, 2018, 11 pages.

Sun, G., et al., "Generating Diverse and Natural Text-to-Speech Samples Using a Quantized Fine-Grained VAE and Auto-Regressive Prosody Prior," published on arXiv as 200203788, Feb. 6, 2020, 5 pages.

Sun, G., et al., "Fully-Hierarchical Fine-Grained Prosody Modeling for Interpretable Speech Synthesis," published on arXiv as 200203785, Feb. 6, 2020, 5 pages.

Al-Sabbagh, R., "Book Notice, Taylor, Paul. 2009. Text-to-Speech Synthesis, Cambridge: Cambridge University Press.," Studies in the Linguistic Sciences: Illinois Working Papers, 2010, pp. 33-36.

Tokuyama, H., et al., "Transcribing Paralinguistic Acoustic Cues to Target Language Text in Transformer-Based Speech-to-Text Translation," Interspeech 2021, ISCA, Aug. 30-Sep. 3, 2021, pp. 2262-2266.

Tsiartas, A., et al., "Toward Transfer of Acoustic Cues of Emphasis across Languages," Interspeech 2013, ISCA, Aug. 25-29, 2013, pp. 3483-3486.

Valle, R., et al., "Flowtron: An Autoregressive Flow-Based Generative Network for Text-to-Speech Synthesis," published on arXiv as 200505957, Jul. 16, 2020, 10 pages.

Wang, Y., et al., "Tacotron: Towards End-to-End Speech Synthesis," published on arXiv as 170310135, Apr. 6, 2017, 10 pages.

Wang, Y., et al., "Style Tokens: Unsupervised Style Modeling, Control and Transfer in End-to-End Speech Synthesis," published on arXiv as 180309017, Mar. 23, 2018, 11 pages.

Wolf, T., et al., "HuggingFace's Transformers: State-of-the-Art Natural Language Processing," published on arXiv as 191003771, Jul. 14, 2020, 8 pages.

You, Y., et al., "Large Batch Optimization for Deep Learning: Training BERT in 76 Minutes," published on arXiv as 190400962, Jan. 3, 2020, 37 pages.

Zhu, X., et al., "Building a Controllable Expressive Speech Synthesis System with Multiple Emotion Strengths," Cognitive Systems Research 59, Jan. 2020, pp. 151-159.

Büring, D., "Focus and Intonation," The Routledge Companion to the Philosophy of Language, London, 2012, pp. 103-115 (21 pages).

Johnson, L., et al., "The LJ Speech Dataset," retrieved from the Internet at: https://keithito.com/LJ-Speech-Dataset/, 2017, 5 pages.

Ladd, R., "Chapter 1: Introduction to intonational phonology," Intonational Phonoloy, Cambridge University Press, Jun. 5, 2012, 40 pages.

* cited by examiner (a) Q. What happened? A. SARAH CLOSED THE HOUSE.
(b) Q. Did Sarah closed the house? A. Sarah closed the house.
(c.1) Q. Who closed the house? A. SARAH closed the house.
(c.2) Q. What did Sarah do? A. Sarah CLOSED the house.
(c.3) Q. What did Sarah closed? A. Sarah closed the HOUSE.
(d.1) Q. Ava closed the house? A. SARAH closed the house.
(d.2) Q. Sarah occupies the house? A. Sarah CLOSED the house.
(d.3) Q. Sarah closed the parking? A. Sarah closed the HOUSE.

FIG. 2

| | | |
|---|---|---|
| (a) | neutral | sarah closed the house |
| (b) | question | <Q> sarah closed the house |
| (c) | focus subject | <F> sarah closed the house |
| (d) | focus verb | sarah <F> closed the house |
| (e) | focus object | sarah closed the <F> house |

FIG. 3

F0-gold vs gold

|  | neutral | question | focus-subject | focus-verb | focus-object |
|---|---|---|---|---|---|
| neutral | 0.0 | 0.68 | 0.42 | 0.5 | 0.33 |
| question | 0.5 | 0.0 | 0.49 | 0.51 | 0.5 |
| focus-subject | 0.43 | 0.69 | 0.0 | 0.49 | 0.33 |
| focus-verb | 0.46 | 0.63 | 0.43 | 0.0 | 0.46 |
| focus-object | 0.35 | 0.71 | 0.33 | 0.52 | 0.0 |

FIG. 7A f0-gold vs synthetic

|  | s_neutral | s_question | s_focus-subject | s_focus-verb | s_focus-object |
|---|---|---|---|---|---|
| neutral | 0.27 | 0.65 | 0.4 | 0.49 | 0.32 |
| question | 0.5 | 0.2 | 0.48 | 0.05 | 0.48 |
| focus-subject | 0.47 | 0.59 | 0.23 | 0.48 | 0.32 |
| focus-verb | 0.47 | 0.59 | 0.42 | 0.23 | 0.45 |
| focus-object | 0.39 | 0.65 | 0.32 | 0.5 | 0.26 |

FIG. 7B intensity-gold vs gold

|  | neutral | question | focus-subject | focus-verb | focus-object |
|---|---|---|---|---|---|
| neutral | 0.0 | 0.27 | 0.58 | 0.5 | 0.59 |
| question | 0.29 | 0.0 | 0.58 | 0.49 | 0.58 |
| focus-subject | 0.59 | 0.55 | 0.0 | 0.41 | 0.42 |
| focus-verb | 0.6 | 0.54 | 0.48 | 0.0 | 0.34 |
| focus-object | 0.63 | 0.57 | 0.43 | 0.3 | 0.0 |

FIG. 7C intensity-gold vs synthetic

|  | s_neutral | s_question | s_focus-subject | s_focus-verb | s_focus-object |
|---|---|---|---|---|---|
| neutral | 0.29 | 0.32 | 0.54 | 0.44 | 0.57 |
| question | 0.29 | 0.29 | 0.55 | 0.44 | 0.58 |
| focus-subject | 0.51 | 0.56 | 0.28 | 0.4 | 0.43 |
| focus-verb | 0.5 | 0.54 | 0.44 | 0.31 | 0.4 |
| focus-object | 0.54 | 0.58 | 0.41 | 0.33 | 0.31 |

FIG. 7D (a) Subject focus vs non focus (b) Verb focus vs non focus

| Number of pauses in natural speech around Subj/Verb/Obj words | | | | | |
|---|---|---|---|---|---|
| Subject focused | Subject neutral | Verb focused | Verb neutral | Object focused | Object neutral |
| 425 | 3 | 446 | 32 | 488 | 33 |

| Number of pauses in synthetic speech around Subj/Verb/Obj words | | | | | |
|---|---|---|---|---|---|
| 502 | 2 | 472 | 43 | 516 | 41 |

FIG. 12

0 % verb focus data

|  | s_neutral | s_question | s_focus-subject | s_focus-verb | s_focus-object |
|---|---|---|---|---|---|
| neutral | 0.29 | 0.69 | 0.43 | 0.36 | 0.36 |
| question | 0.5 | 0.2 | 0.49 | 0.49 | 0.48 |
| focus-subject | 0.48 | 0.68 | 0.24 | 0.37 | 0.34 |
| focus-verb | 0.44 | 0.55 | 0.39 | 0.43 | 0.41 |
| focus-object | 0.42 | 0.7 | 0.35 | 0.36 | 0.28 |

FIG. 13A

25 % verb focus data

|  | s_neutral | s_question | s_focus-subject | s_focus-verb | s_focus-object |
|---|---|---|---|---|---|
| neutral | 0.27 | 0.65 | 0.4 | 0.49 | 0.33 |
| question | 0.5 | 0.21 | 0.48 | 0.49 | 0.48 |
| focus-subject | 0.45 | 0.64 | 0.24 | 0.48 | 0.33 |
| focus-verb | 0.47 | 0.59 | 0.42 | 0.25 | 0.44 |
| focus-object | 0.38 | 0.65 | 0.33 | 0.51 | 0.27 |

FIG. 13B

50 % verb focus data

| | s_neutral | s_question | s_focus-subject | s_focus-verb | s_focus-object |
|---|---|---|---|---|---|
| neutral | 0.27 | 0.65 | 0.4 | 0.49 | 0.33 |
| question | 0.5 | 0.2 | 0.48 | 0.49 | 0.49 |
| focus-subject | 0.44 | 0.64 | 0.24 | 0.48 | 0.33 |
| focus-verb | 0.46 | 0.58 | 0.42 | 0.25 | 0.45 |
| focus-object | 0.38 | 0.64 | 0.33 | 0.51 | 0.28 |

FIG. 13C

END-TO-END NEURAL TEXT-TO-SPEECH MODEL WITH PROSODY CONTROL

PRIORITY INFORMATION

This application claims priority to and benefit from U.S. Provisional Patent Application Ser. No. 63/266,215, filed Dec. 30, 2021, which application is incorporated in its entirety by reference herein.

FIELD

The present disclosure relates generally to machine learning, and more particularly to methods and systems for training neural language models for prosody control.

BACKGROUND

Text-to-speech (TTS) systems and methods attempt to produce human-like speech by processing natural language text inputs. Neural network-based TTS has made rapid progress. Both synthetic speech quality and inference speed have been improved, with the latter benefitting from non-autoregressive TTS models.

However, existing systems lack intuitive control over prosody. Prosody includes attributes such as rhythm or duration, pause, loudness, and melody or pitch. It reflects not only the speaker's personal state (e.g., emotion), but also linguistic information such as syntax, semantics, and pragmatics. In English, for example, an identical text can be spoken prosodically differently. Different prosodic attributes for the same text can convey different meanings in speech.

Controlling prosody presents problems for existing TTS models. For example, features such as pitch and duration are difficult to predict because of their large fluctuations over time. Generating speech with fine-grained prosody control (e.g., prosodic prominence, contextually appropriate emotions, etc.) remains a challenge.

SUMMARY

Provided herein, among other things, are methods and systems for generating, e.g., training or fine-tuning, an end-to-end neural text-to-speech (TTS) model to process an input text to generate speech representations and to control prosody in the speech representations. Methods and systems may be implemented, for instance, by a computer. An annotated set of text documents are input into the TTS model stored in a memory. The annotated set of text documents include annotations inserted therein to indicate prosodic features. Using a processor, the TTS model is trained using the annotated set of text documents and a corresponding dataset of speech representations of the text documents that include prosody associated with the indicated prosodic features. The trained TTS model learns to associate the prosody with the annotations.

Additional embodiments provide a processor-implemented neural text-to-speech (TTS) model stored in a memory for processing an input text to generate speech representations. An encoder is trained to process the input text including annotations inserted therein indicating prosodic features in the input text. A decoder is trained to generate speech representations of the input text that include prosody associated with the indicated prosodic features. The TTS model is trained to associate the prosody with the indicated prosodic features.

Additional embodiments provide a method for generating a corpus for end-to-end training of a neural model to control prosody. A seed is provided comprising an initial set of documents. Using a processor, the seed is expanded using a language model trained using masked language model (MLM) methods to generate an expanded set of documents, where expanding comprises masking different portions of each of the initial set of documents and using the language model to predict the masked portions. The masked portions are selected based on their prosody for different focus types of the document among a set of focus types. For each of a plurality of groups of the expanded text documents, each text document in the group is annotated, using a processor, to indicate prosodic features. Each text document in the group relates to a different focus type among the set of focus types. The indicated prosodic features for each text document in the group relate to the respective focus type for that document. Each annotated text document in the group is paired, using a processor, with a speech representation of the input text that includes prosody associated with the indicated prosodic features for the text document. The annotated set of text documents and speech representations are stored.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings.

FIG. 2 shows examples of four types of focus in a question-answer dialogue.

FIG. 3 shows example annotations for the text document (sentence) "Sarah closed the house" shown in FIG. 2.

FIGS. 7A-7D show curves for each of five instances (neutral, question, focus_subject, focus_verb, focus_object) compared to each other pairwise using Dynamic Time Warping (DTW) distance. The confusion matrices based on these distances are displayed for natural speech (FIGS. 7A, 7C: distance between a natural speech instance and another natural speech instance) and synthetic speech (FIGS. 7B, 7D: distance between a synthetic speech instance and a reference natural speech instance).

FIG. 12 shows a comparison of a number of detected pauses between focused and neutral sentences, for natural and synthetic speech.

FIGS. 13A-13C show results of varying the amount of training data containing utterances with focus verb: 0% (FIG. 13A), 25% (FIG. 13B) and 50% (FIG. 13C). DTW distances are displayed between F0 curves of each of the 5 instances (neutral, question, focus subject, focus verb, focus object) compared to each other (natural vs. synthetic).

In the drawings, reference numbers may be reused to identify similar and/or identical elements.

DETAILED DESCRIPTION

Introduction

Figure 1:
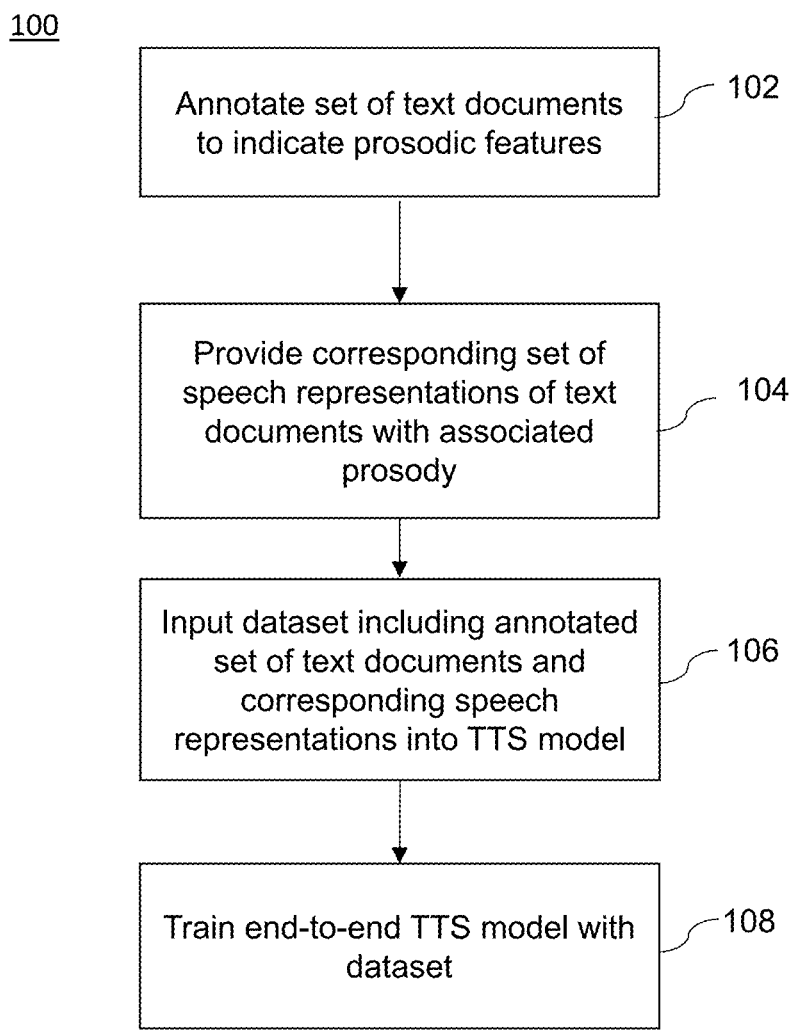
FIG. 1 shows an example method for generating (e.g., training or fine-tuning) an end-to-end neural network (neural) text-to-speech (TTS) model.

It would be useful for TTS systems to correctly convey prosody along with other information transmitted by a speaker. For example, it may be useful to emphasize the word "HOUSE" in the sentence, "Sarah closed the HOUSE". However, generating speech with fine-grained prosody control (e.g., controlling features such as prosodic prominence, contextually appropriate emotions, etc.) by processing natural language text inputs remains a challenge.

Example methods and systems provided herein train an end-to-end neural network-based (neural) sequence-to-sequence (seq2seq) model embodied in a text-to-speech (TTS) model (e.g., in a memory) to control prosody explicitly and directly from an input text (a symbolic input) that is input to the TTS model. An example input text is a text document, which can include one or more sentences or phrases made up of lexical units (e.g., word-based features such as words, sub-words, chains of words, syllables, phonemes, etc.).

A set of input text representing natural language is directly annotated (e.g., coded, labeled, tagged, etc.), for instance, using a processor, to indicate prosodic features and explicitly control prosody. Generally, prosody, which contributes towards rhythmic and acoustic effects of natural language, is made up of prosodic attributes. More specifically, prosodic attributes of natural language as used herein include pitch, accent, tone, rate, duration, projection and intonation. In contrast, prosodic features as used herein identifies the intended effect of the prosodic attributes applied to natural language (e.g., focus, semantics, emotion etc. that are used to impart meaning to natural language). Prosody may be applied to different lexical units of natural language (e.g., sub-word, a word, phrase or a sentence) to achieve different effects (e.g., neutral (declarative) or no focus, question (interrogative) or broad focus, or narrow or contrastive focus). The meaning given to natural language using such prosodic attributes contributes to prosodic features that are understood by a listener. The TTS model is trained, e.g., end-to-end, using the annotated set of input text and a corresponding dataset of speech representations of the text documents that include prosody associated with the indicated prosodic features. The trained TTS model learns to associate prosody with the annotations. The annotated input text and corresponding speech representations can be provided, for instance, as <text, audio> source/target pairs.

Example methods and systems can annotate the input text to indicate prosodic features such as but not limited to one or more focus types. Example models can provide explicit control of prosody from the text input, for instance at a word level (focus), sub-word level, utterance level (affirmative or interrogative form, or a global or neutral focus), or a combination through composition.

Some existing methods aim to control prosody in TTS models by modifying prosodic attributes such as duration, F0 (pitch), or energy in output speech without affecting speaker characteristics. Example methods herein, by contrast, provide explicit control of prosody from the symbolic (text) input.

Other existing methods such as those disclosed in Wang et al., Style tokens: Unsupervised style modeling, control and transfer in end-to-end speech synthesis, In International Conference on Machine Learning, pages 5180-5189, PMLR, 2018, use "global style tokens" (GSTs), which are a set of embeddings that can be viewed as soft interpretable labels used to control TTS (speed, speaking style). This approach learns a quantized representation of its input. However, these style tokens are difficult to interpret, at least because they represent meaningless prosodic dimensions learned in an unsupervised way. Additional example approaches, such as those disclosed in Morrison et al., Controlling neural prosody synthesis, In Interspeech 2020, Shanghai, China, 25-29 Oct. 2020, pages 4437-4441, ISCA, incorporate user control into a prosody generation model by manually modifying prosodic attributes such as F0 (pitch) contour.

Control tags have been used in other domains such as neural machine translation (NMT) (e.g., as global tags for controlling domain adaptation), or local tags to control syntactic or semantic features such as politeness or text casing. However, such control tags have not been applied to prosody control in TTS models.

Example trained TTS models provided herein can control prosody in various TTS applications, including a variety of applications that include human-computer interfaces. For example, TTS models trained according to methods herein can be used to programmatically manipulate speech produced by smart speakers, such as but not limited to Google Home, Alexa, Clova, Siri, etc. As another example, speech-based dialogue systems can incorporate example TTS models, such as to allow a dialogue with a robot. This dialogue may include, as a nonlimiting example, question answering, including enabling the robot to answer and correct questions.

Still other example applications include automated speech recognition (ASR) or speech-to-speech neural machine translation systems that provide prosody transfer or translation between languages (e.g., between an input signal and an output translation) to carry the real meaning of a source utterance spoken by a human. For instance, the focused words in the input speech can also be focused in the output speech. Other applications involving natural language processing, search-and-recommendation systems, etc. can benefit from example trained end-to-end TTS models.

Example methods are also provided for generating a corpus for end-to-end training of a neural model to control prosody. Experiments described herein using a generated corpus demonstrate that example training methods can provide a TTS system in which a fine-grained prosodic feature can be conveyed correctly using control tokens. Synthetic and natural utterances were compared, and the results showed that example prosodic patterns including contrastive focus, as represented by variations of pitch (F0), intensity, and duration, can be learned accurately.

Example Model Generation Method

Referring now to the figures, FIG. 1 shows an example method 100 for generating, e.g., training or fine-tuning, an end-to-end neural network (neural) text-to-speech (TTS) model. The model can be configured to process an input text to generate speech representations and to control prosody in the speech representations explicitly and directly from the input text.

A set of text documents is annotated to indicate prosodic features at 102. Each text document can be embodied in or include, for instance, one or more sentences, phrases, utterances, etc. The text documents can each be composed of a plurality of words, sub-words, phrases, characters, tokens, etc.

The prosodic features can be based on one or more linguistic features in a respective text document, such as syntax, semantics, or pragmatics. An example linguistic feature is focus on one or more portions of the text document (e.g., words, sub-words (e.g., "Christoph-ER, not Christophe"), multi-word sequences, phrases, parts of speech, syllables, phonemes, etc.).

Focus may be based on one or more focus types selected from among a set of focus types, and prosodic features for such focus types may be indicated by the annotations. Example focus types include neutral or no focus; broad or global focus; narrow focus on portions of the document such as a subject, verb, or object; or contrastive focus on portions of the document such as a subject, verb, or object. Example focus types are disclosed in more detail below.

The annotations are explicitly and directly provided, e.g., directly input or inserted, in the text documents to indicate prosodic features and control prosody. Example annotations include, for instance, control tags (codes), control tokens, etc., which are directly included (e.g., inserted) within the text documents. Example annotation methods and example annotations are disclosed herein, though it will be appreciated that other annotations and annotating methods are possible.

A corresponding set of speech representations of the text documents is provided at 104. The speech representations include prosody that is associated with the indicated prosodic features in the annotated dataset. Prosody provides contrast in the speech representations for one or more lexical units. Lexical units include, e.g., basic elements in the generated speech such as a single word, part of a word (sub-words, syllables), or a chain of words (e.g., compound words, short utterances, etc.).

The prosody may be represented by one or more prosodic attributes. Example prosodic attributes include, but are not limited to, pitch, tone, rate, duration, rhythm, pause, intensity (energy), projection, intonation, or a combination of one or more of these, for one or more spoken lexical units provided by the speech representations.

The speech representations may be embodied in, for instance, speech samples, such as mono-speaker samples, multi-speaker samples, or a combination. Speech samples may be generated from human speech, synthetic speech (e.g., voice synthesizer, vocoder, etc.), or a combination (e.g., both human and synthetic speech, processed human speech, etc.).

Speech representations may additionally or alternatively be embodied in a speech signal that can be processed downstream by a voice synthesizer, vocoder, etc. to generate speech. An example of such speech signals is a spectrogram, such as a Mel-spectrogram.

The prosody in the speech representations is associated with the indicated prosodic features in the annotated set of text documents. For example, each annotated text document may be paired with a speech representation of that text document, where the speech representation includes prosody associated with the indicated prosodic features for the paired text document. Pairing refers to both the text document and the associated speech representation being included in a dataset (which can include one or a combination of datasets), whether or not they are explicitly or implicitly linked in the dataset. Paired text documents and associated speech representations can provide text/audio (<text, audio>) source/target pairs.

Text documents and associated speech representations can be provided in a plurality of groups within the dataset. For example, a group of text documents can include text documents where each text document is annotated to indicate prosodic features for a particular focus type selected among the set of focus types.

Each text document in a group, for instance, can be identical to other text documents in the group, except for the annotations by focus type, and different from text documents in other groups. Example groups of text documents are shown and described herein.

The speech representations paired with each text document in the group can provide a group of text/audio pairs, and the dataset can include a plurality of these groups of text/audio pairs. Each text document in the group can relate to a different focus type among the set of focus types, for example. In this way, for each text/audio pair, each speech representation also relates to a different focus type among the set of focus types.

The dataset including the annotated set of text documents and corresponding speech representations is input into the end-to-end TTS model at 106. An example end-to-end TTS model is embodied in a sequence-to-sequence (seq2seq) model, e.g., in a memory, which model can include (e.g., be represented at least in part by) one or more updateable parameters, though the model may also include other parameters that fixed or not updated. The TTS model can be an autoregressive model or a non-autoregressive model. Embodiments of TTS models include transformer-based models, examples of which are provided in more detail below.

The end-to-end TTS model is trained using the dataset at 108. Generally, training begins by initializing updateable parameters of the model, e.g., weights and biases, which are then iteratively adjusted after evaluating an output result produced by the model for a given input against the expected output. Example training methods are provided herein, and other methods for training TTS models using a dataset will be appreciated by those of ordinary skill in the art.

The TTS model may be trained using one or more updateable default training parameters. For example, the TTS model may be pretrained to provide default training parameters. Default training parameters may be initialized, e.g., randomized, initialized using prior knowledge, etc.

Example Prosodic Feature: Focus

Aspects of an example prosodic feature, focus, will now be explained for illustration. However, it will be appreciated that other prosodic features can be indicated using annotations and associated with prosody in example methods.

Focus can be generally categorized by focus types. Example focus types include but are not limited to global focus, neutral focus, narrow focus, and contrastive focus.

Global focus, for instance, can be associated with spoken emphasis on all portions (e.g., elements such as words, sub-words, word spans, etc.) of a statement (such as a sentence). Neutral focus, on the other hand, can be associated with an absence of spoken emphasis. Narrow focus emphasizes one or more specific portions (e.g., elements such as words, sub-words, word spans, etc.) in a sentence, for example in a subject, verb, or object, answering to a "WH" question (e.g., where, when, why, what, who, whom, which, whose, or how questions). Contrastive focus can be associated with an emphasis on one or more specific portions (e.g., elements such as words, sub-words, word spans, etc.) in a portion of a sentence, e.g., in a subject, verb, or object, that are contrary to the presuppositions of the interlocutor.

For example, prosody can be observed on focused words in a question-answer dialogue, where corrective contrasts are realized through the prosody. FIG. 2 shows examples of four types of focus in a question-answer dialogue. In the first type shown in FIG. 2, 'broad focus' or global focus (a), the entire statement is the answer, and all words are focused (shown in FIG. 2 as capital letters). The second type shown, 'given' or neutral focus (b), is where there is no focus, as all information in the statement is given.

In the third type, 'narrow focus' (c), new information is given by answering to a WH-question (e.g., "Who closed the house?"). For this type, the focus should be on the precise word in the answer according to the question, i.e., subject (c.1) ("SARAH closed the house"), verb (c.2) ("Sarah CLOSED the house"), or object (c.3) ("Sarah closed the HOUSE").

The fourth type, 'contrastive focus' (d), is where the answer corrects the information. For this type, the word or other element, e.g., in the subject (d.1), verb (d.2), or object (d.3) is prosodically emphasized to convey this focused information.

It has been disclosed that four distinctive F0 pitch forms correspond to each of these four focus types in human speech production. Of these, contrastive focus shows the most prominent form regarding the pitch of focused words. However, the spoken utterances of FIG. 2 in English (where focus is only prosodically marked) would lead to different word orderings if translated to a language such as, say, Hungarian (where focus is explicitly marked by placing the verb immediately after the focused word).

Example Annotations

FIG. 3 shows example annotations for the text document (sentence) "Sarah closed the house" shown in FIG. 2. In the example annotated sentence capitalization and punctuation have been removed from each example, which can be performed, e.g., by a processor, though this is not required in all methods.

The example annotations shown in FIG. 3 are embodied in control tokens, e.g., tags, codes, etc., respectively corresponding to focus types in the example set of focus types, namely: neutral or declarative focus (a); global or interrogative focus (b); narrow or contrastive focus on subject (c); narrow or contrastive focus on verb (d); and narrow or contrastive focus on object (e). In the example annotations, the neutral focus type for sentence (a) is indicated by an absence of control tokens, though a control token representing neutral focus could instead be provided. The global focus type for sentence (b) is indicated by a global token, as shown <Q>, that is inserted directly in the sentence at the beginning of the sentence, though it is possible that global focus could be indicated by a global token at the end of the sentence, by a pair of global tokens surrounding the sentence, etc.

The narrow or contrastive focus is indicated by a local control token, as shown <F>, that is inserted proximate to, e.g., immediately prior to, the subject in sentence (c), the verb in sentence (d), and the object in sentence (e), respectively. The local control token can alternatively be inserted proximate to particular elements such as words, sub-words, etc. As another example, the local control token could be embodied in a pair of local control tokens spanning elements such as words, sub-words, etc. over an interval, in a portion of the sentence (subject, verb, object), or provided in other ways. Other example tags or control tokens can include punctuation or other symbols. Combinations of control tokens can be used.

Example End-to-end TTS Model

Figure 4:
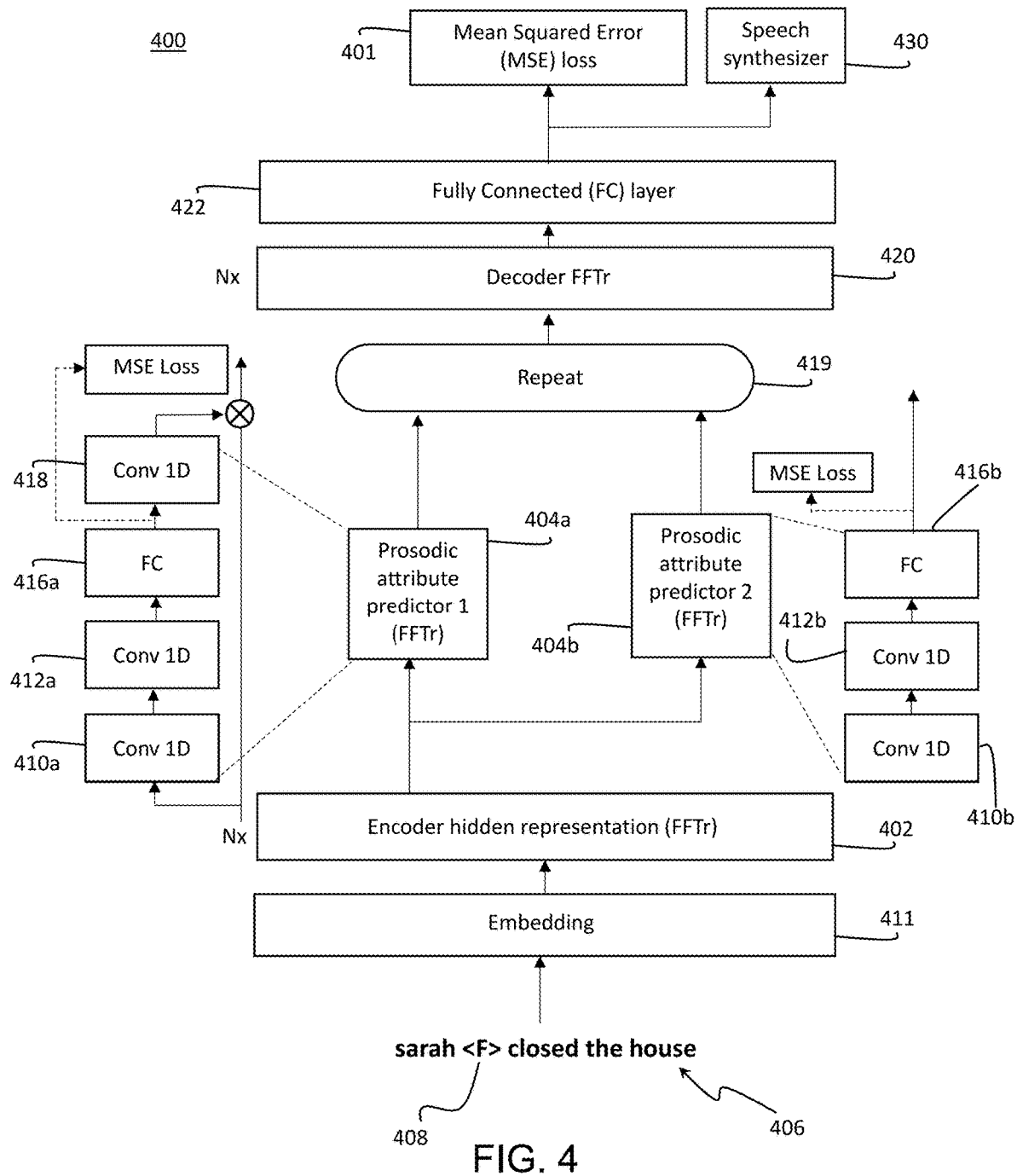
FIG. 4 shows an example architecture for an end-to-end neural TTS model.

FIG. 4 shows an example architecture for an end-to-end neural TTS model 400, which can be implemented by a processor and memory. End-to-end neural TTS architectures have been disclosed for replacing prior TTS systems that involved complex pipelines of components optimized independently. Such integrated models can be trained on <text, audio> pairs.

The example TTS model 400 is a non-autoregressive model. Integrated TTS models based on autoregressive models can suffer from slow inference speed and robustness. Non-autoregressive TTS models such as Fastspeech (e.g., Ren et al., Fastspeech: Fast, robust and controllable text to speech, arXiv:1905.09263, 2019; Ren et al., Fastspeech 2: Fast and high-quality end-to-end text-to-speech arXiv: 2006.04558.2020), Fastpitch (Adrian Lancucki, Fastpitch: Parallel text-to-speech with pitch prediction, ICASSP 2021), and JDI-T (Lim et al., transformer for text-to-speech without explicit alignment. Proc. Interspeech 2020, pages 4004-4008, 2020) can address issues with autoregressive models by generating Mel-spectrograms with extremely fast speed, while achieving comparable voice quality with previous autoregressive models.

Fastpitch, for instance, is a fully parallel Transformer-based TTS system, conditioned on fundamental frequency (pitch) contours. It allows faster synthesis of Mel-spectrograms and has achieved improved mean opinion scores (MOS). Its architecture is based on Fastspeech (Ren et al., 2019, 2020), which is composed of two Feed-Forward Transformer (FFTr) stacks. The first FFTr produces a hidden representation h from its input sequence, which is used for duration and average pitch prediction for every character using a duration and a pitch prediction module. The sum of the pitch embedding and the hidden representation h is given to the second FFTr to produce a Mel-spectrogram.

The example model 400 is embodied in a transformer-based model. A nonlimiting example model 400 can have an architecture including features similar to the models disclosed by Lancucki et al. and Ren et al. but trained using annotated text documents to associate prosody in speech representations output by the TTS model with annotations of prosodic features in input text.

The model 400 generally includes an encoder including a first feedforward transformer (FFTr) stack, which can operate in resolution of input tokens, and a decoder including a second FFTr stack, which can operate in resolution of output elements of a speech representation, such as frames in a spectrogram.

The encoder is trained to process an input text 406 including annotations 408 indicating prosodic features in the input text. The example encoder in the model 400 includes one or more hidden representation FFTr layers 402 for generating a hidden representation h of the input text, and prosodic attribute predictors 404a, 404b embodied in FFTs layers for predicting respective attributes of prosody for each token, lexical unit, temporal unit (e.g., on the order of milliseconds, tens of milliseconds, hundreds of milliseconds, seconds), etc. For instance, the prosody may be represented by prosodic attributes such as but not limited to pitch, rate, duration, rhythm, pause, tone, projection, intonation, or intensity (energy) of one or more spoken lexical units or temporal units. For instance, the prosodic attribute predictor 404a may be trained to predict duration for each character or unit, and the prosodic attribute predictor 404b may be trained to predict pitch for each character or unit. Predicting prosodic attributes for a lexical unit or token can be performed in some example embodiments by predicting the prosodic attributes for the temporal units that make up that lexical unit or token.

The prosodic attribute predictors 404a, 404b can each include layers such as convolutional layers, activation layers, dropout layers, and normalization layers. For example, in the model 400, the prosodic attribute predictor 404a (e.g., for predicting pitch) includes convolutional layers 410a, 412a, a fully connected (FC) layer 416a, and an additional convolutional layer 418. The prosodic attribute predictor 404b (e.g., for predicting duration) includes convolutional layers 410b, 412b, and a fully connected layer 416b.

An embedding layer 411 embeds tokens in the input text 406 and provides the embedded tokens to the encoder. The hidden representation of the input text from hidden representation layers 402 can be combined (e.g., summed) with the prediction for the one or more prosodic attributes from associated predictors 404a, 404b and provided to a decoder 420, and the process repeats at 419, e.g., to predict prosodic attributes for each character, token, lexical unit, temporal unit, etc. The decoder 420 embodied in an FFTr stack 420 and an FC layer 422 is trained to generate speech representations of the input text that include prosody associated with the annotations 408.

An output of the model 400 generated via the decoder 420, such as a speech signal (e.g., a spectrogram), can be provided to a speech synthesizer 430, such as but not limited to a decoder (e.g., with a vocoder), for generating speech from the speech signal. For training the model 400, mean squared error (MSE) losses 401 can be calculated based on outputs from the FC layer 422 of the model 400 and from the prosodic attribute predictors 404a, 404b. Additional features of an example trained model having an architecture based on the model 400 are described below with respect to experiments.

Preparing a Training Dataset

Annotated text documents can be paired with associated speech representations as text/audio pairs to provide a dataset for training an end-to-end TTS model. For instance, the example annotated sentences in FIG. 3 provide an example of a group of text documents that can be respectively paired with a group of associated speech representations to form a group of text/audio pairs. A dataset can include a plurality of such groups.

Figure 5:
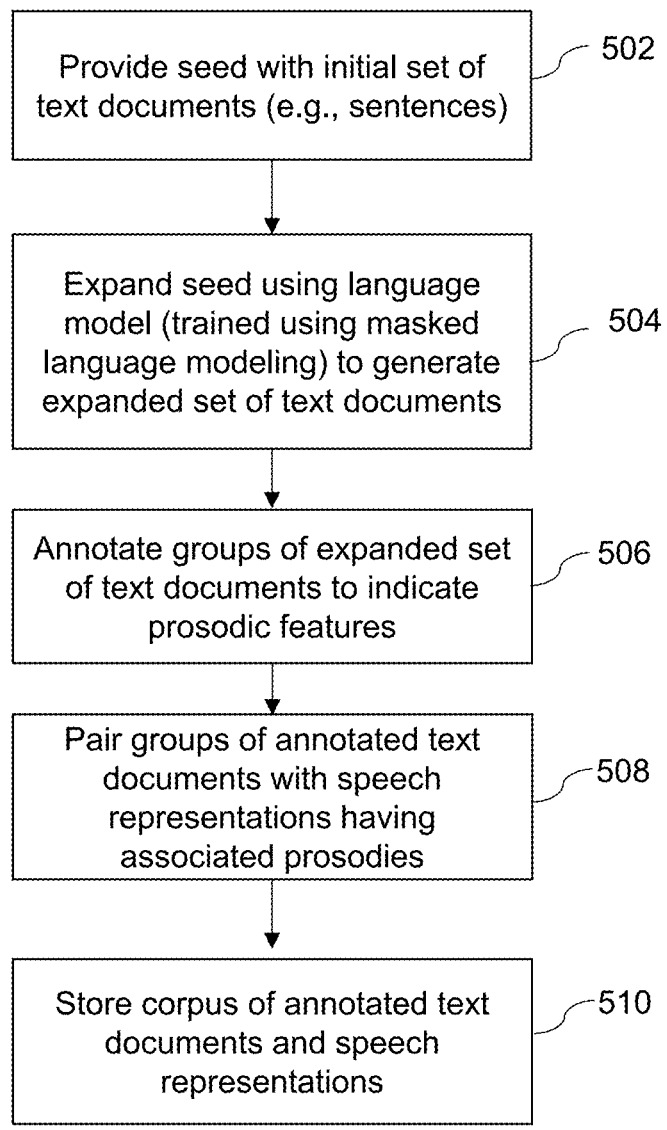
FIG. 5 shows an example method for generating a training dataset embodied in a corpus for end-to-end-training of a neural TTS model to control prosody.

FIG. 5 shows an example method 500, which may be implemented by a processor and memory, for generating a training dataset embodied in a corpus for end-to-end-training of a neural model, e.g., a TTS model, to control prosody. The generated training dataset can include a plurality of groups of text/audio pairs.

In the example method 500, an expanded set of text documents is provided. An initial set of text documents, such as but not limited to sentences, is provided at 502 as a seed. The seed is then expanded at 504 using a model trained using a masked language modeling (MLM) method, which is a self-supervised pretraining objective, e.g., as disclosed in Bidirectional Encoder Representations from Transformers (BERT) (Devlin et al., Bert: Pre-training of deep bidirectional transformers for language understanding, In Proceedings of the 2019 Conference of the North American Chapter of the Association for Computational Linguistics: Human Language Technologies, Volume 1 (Long and Short Papers), pages 4171-4186. 2019), to generate the expanded set of documents. However, if a sufficient number of text documents (e.g., sentences) is available for training in the initial set of documents, the step of expanding a seed 504 can be omitted, and the initial set of documents can be used for additional method steps.

In an example expanding of a seed 504, different portions of each of the initial set of documents in the seed can be masked. The masked portions of each text document can be selected, for instance, based on their respective prosody for different focus types of the text document. These focus types can be selected from among a set of focus types, as explained above. For instance, to train for recognizing contrastive focus, different subject, verb, and object words in the initial set of documents can be masked. The trained language model is then used to predict the masked portions in each of the documents, generating output sequences that expand the initial set of documents. The generated documents in the expanded set can be reviewed, verified, corrected, filtered, etc. before being used in further processing.

For each of a plurality of groups of the expanded text documents, each text document in the group is annotated at 506 to indicate prosodic features. For example, each document in a group can relate to one of the different focus types among the set of focus types, and the respective prosodic features indicated by the annotations can relate to the respective focus type for the text document. Annotations may include, for instance, directly inserted annotations as disclosed herein. An example of such a group is the group of sentences shown in FIG. 3.

Each of the annotated text documents is paired at 508 with a speech representation of the input text. Speech representations can include speech samples (including, e.g., direct speech samples such as recorded audio speech samples, indirect speech samples such as signals that can be used to generate audio speech samples, etc.). As provided above, the speech samples can be mono-speaker or multi-speaker samples, or a combination, and can be generated from received human speech, from synthetic speech, or a combination. In an example method for generating speech representations from received human speech, a text document can be presented to a human speaker via an interface (e.g., a display), with an annotation indicating a focus among the set of focuses. This displayed annotation can include, for instance, one or more of punctuation, capitalization, or a tag (code, label, etc.). Speech samples including the text documents as read by the human speaker with prosodic attributes can be received by a processor-based system, processed as desired (such as but not limited to audio processing) and recorded.

The speech representation includes prosody associated with the annotations for the text document. For instance, the prosody can provide contrast for one or more lexical units in the input text based on linguistic features in the input text as provided above. Example linguistic features can include syntax, semantics, or pragmatics, including focus on one or more portions of the text document based on focus types in the set of focus types. The inserted annotations indicate this focus directly and explicitly in the text documents.

In this way, the annotated text documents in a group and the respectively paired speech representations provide a group of text/audio pairs. For each text/audio pair, each speech representation can respectively relate to a different focus type among the set of focus types. As provided above, in the example corpus, each text document in a respective group can be identical to other text documents in the group other than the annotations, and each text document in a respective group can be different from text documents in others of the plurality of groups. The corpus can include a plurality of the groups of text/audio pairs. Speech representations may be processed, e.g., sampled, trimmed, filtered, compressed, equalized, etc. before being stored in the corpus.

The corpus of annotated text documents and associated speech representations is then stored at 510. The stored corpus can be used for training, validation, and/or testing of end-to-end TTS models, such as but not limited to those having the architecture of model 400. Additional example features of a generated corpus are provided below.

End-to-End Text-to-Speech Operation

Figure 6:
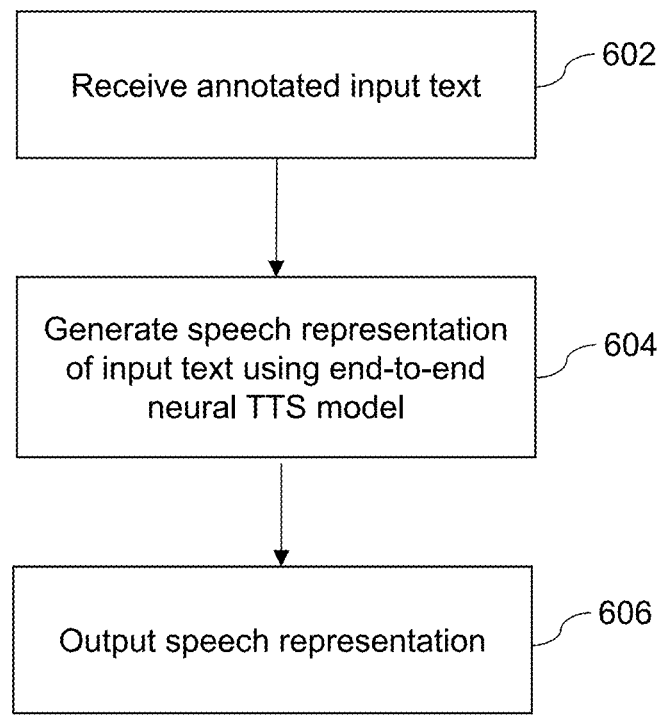
FIG. 6 shows an example text-to-speech method that can be performed using a trained end-to-end TTS model.

FIG. 6 shows an example text-to-speech method 600 that can be performed using the trained end-to-end TTS model 400. The end-to-end TTS model 400 can be provided in any suitable processor-based device or system. The end-to-end TTS model 400 may be used generally as a standalone model (e.g., to receive an input text (or annotated input text) and generate a speech signal), or incorporated into a larger model such as a speech-to-speech model, a neural machine translation (NMT) model, a recommendation engine, or any other compatible model, including various compatible models providing human-computer interfaces.

A new input text, received from any front-end source, is annotated to indicate prosodic features as provided herein. Front-end sources include, for instance, directly input text, text generated from translating or otherwise transforming another input sequence, text generated by a speech-to-text model, e.g., having a speech encoder and text decoder, text generated in response to a query or during a dialogue, or any other suitable source.

The text may be annotated manually (e.g., handcrafted), e.g., using a processor-based system, or automatically using a processor. A preprocessing model or other front-end model connected to or in communication with the trained end-to-end TTS model 400 may be provided (and trained, if necessary) for automatically annotating text to indicate prosodic features. Alternatively or additionally, a user may use an interface such as a keyboard, mouse, touch pad, voice control, joystick, etc. to indicate a location and selection of an annotation, which is received by a processor-based system for annotating the text. A combination of manual and automatic annotation, e.g., machine-assisted annotation, can be provided.

The trained end-to-end TTS model 400 receives the annotated input text 602, processes the annotated input text, and generates a speech representation 604 that includes prosody corresponding to the annotations in the annotated new input text. The speech representation is then output at 606. The output speech representation can be provided by a speech synthesizer, as a spectrogram or waveform that is displayed, printed, presented, or stored, or may be provided in other ways. For instance, the end-to-end TTS model can be incorporated into a smart speaker, and the smart speaker can generate audio speech signals with prosody.

Experiments

In experiments, a mono-speaker corpus of 36$k$ English utterances was prepared that is usable for prosody-controlled TTS as well as for phonetic analyses on contrastive focus in English. An example neural TTS model based on Fastpitch was trained with the input text annotated with various control tags to mark specific prosodic elements. Decoding (using a vocoder) was provided using a model, WaveGlow (Prenger et al., Waveglow: A flow-based generative network for speech synthesis. In ICASSP 2019-2019, IEEE International Conference on Acoustics, Speech and Signal Processing (ICASSP), pages 3617-3621, IEEE). Evaluation was performed with different metrics, and the prosodic patterns of contrastive focus from natural and synthetic speech were compared. The experiments demonstrated the feasibility of controlling prosody directly from the input text.

Corpus Creation

A dedicated annotated dataset was produced for the example problem of contrastive focus speech generation. Starting from a seed of 50 short sentences, similar to those shown in FIG. 2($d$), the sentences were expanded using BERT (Bidirectional Encoder Representations from Transformers) (Devlin et al., Bert: Pre-training of deep bidirectional transformers for language understanding, In Proceedings of the 2019 Conference of the North American Chapter of the Association for Computational Linguistics: Human Language Technologies, Volume 1 (Long and Short Papers), pages 4171-4186. 2019), using the HuggingFace library (Wolf et al., Huggingface's transformers: State-of-the-art natural language processing. arXiv:1910.037712019).

The different subject, verb, and object words in the initial utterances were masked, and BERT was used to predict the masked words. More than 10K utterances were generated to expand the initial sentence set. The full corpus was then manually verified before recording the corresponding speech. Sentences that were not semantically correct were removed. After manual validation of the full corpus and correction, 7320 sentences were kept.

Recording: A professional American English speaker performed human speech recording for five different types of each of these sentences. After a short training session, the speaker recorded 732 sessions, where each session contained 10 groups of target sentences and each group contained five versions of the same utterance: neutral (declarative); question (interrogative); contrastive focus on subject; contrastive focus on verb; and contrastive focus on object, e.g., as shown in FIG. 2($d$)).

The neutral and question sentences were presented with a corresponding punctuation, a full stop, and a question mark, respectively. To elicit contrastive focus for the latter three cases, a question-answer pair was prompted: the question in text was presented on the first line on the screen, and the answer statement to the question with the focused word in upper case was presented to be read as a target sentence.

The recordings were saved on a server as audio/text pairs. Postprocessing was performed to filter out problematic samples. 26.7 hours of recorded signals were generated for a total of 36600 recorded utterances.

Experiments were conducted by training the Fastpitch neural TTS model (Lancucki, 2021). WaveGlow (Prenger et al., 2019) was used as a vocoder to generate English speech signals from the Mel-spectrograms.

For training, the audio signals were sampled at 22 KHz. Silences at the beginning and end of the utterances were trimmed with a threshold of 30 dB.

The input text was stripped of punctuation, lowercased, and annotated with various control tags to mark specific prosodic elements, as shown in FIG. 3. For the interrogative and declarative cases, global tags <Q> at the sentence level were used to distinguish question and neutral. Neutral sentences did not have a dedicated tag. For contrastive focus, local tags <F> were inserted at the word level, just prior to the word to be focused.

NVIDIA FastPitch implementation was used with default training parameters. Each FFTr included a 1-D conv with ReLU activation followed by dropout and layer norm. Both duration and pitch predictors had the same architecture: 1-D conv layers with ReLU, layer norm, and dropout layers. A dropout rate of 0.1 was used. LAMB optimizer (You et al., Large batch optimization for deep learning: Training bert in 76 minutes, In International Conference on Learning Representations, 2019) was used with a learning rate 0.1, $\beta_1=0.9$, $\beta_2=0.98$, and $\in=1^{-9}$.

The data was split into train, validation, and test sets (80/10/10 random split based on full groups of 5 sentences), and the model was trained for 1000 epochs. For decoding, a preexisting WaveGlow model (Prenger et al., 2019) trained on LJSpeech (Ito and Johnson, The LJ speech dataset, https://keithito.com/LJ-Speech-Dataset/2017) was used as the vocoder.

Results

Evaluation of Synthetic Contrastive Focus: Four groups of wav files (from the validation set) were provided, which were the recordings from the female speaker. Each group contained five sentence types: neutral, question, focus_subject, focus_verb, and focus_object. The synthetic counterpart of these utterances was also provided, which was obtained using the example end-to-end TTS model learned using the training set of the experimental corpus. Listening to those examples demonstrated that the trained end-to-end TTS model was able to convey prosodic information related to focus.

For a quantitative and qualitative evaluation of an example model, the pitch (F0), Intensity, and Duration of the generated samples were analyzed. Dynamic Time Warping (DTW) (Sakoe and Chiba, Dynamic programming algorithm optimization for spoken word recognition. IEEE Transactions on Acoustics, Speech, and Signal Processing, 26:43-49.1978) was used to measure a distance directly between the F0 curves (resp. intensity curves), for each group of five sentences. DTW was used due to its ability to compute distances between temporal series of different lengths. The distance was measured between each sample type (neutral, question, focus_subject, focus_verb, focus_object) inside the gold standard (natural speech) and between gold standard and the synthetic speed. In other words, the variation of the prosodic patterns within natural speech (gold vs gold) was measured to highlight the differences between focused and neutral sentences (or between different places of focus), and the variation between natural and synthetic speech (gold vs synthetic) was measured to evaluate the ability of the example TTS model to reproduce prosodic patterns correctly. The results were averaged on the test corpus (590 groups of 5 sentences, corresponding to 2950 audio files).

The results are summarized in FIGS. 7A-7D as heatmaps to visualize the relative distances between each feature type in the natural and synthetic speech. For each example prosodic feature, F0 (FIGS. 7A-7B) and Intensity (FIGS. 7C-7D), the matrix in FIGS. 7A and 7C compared the natural speech to itself and the matrix in FIGS. 7B and 7D compared the natural speech to the synthetic speech. The lines correspond to the natural speech, and the columns correspond to the natural speech (FIGS. 7A, 7C) or to the synthetic speech (FIGS. 7B, 7D).

Figures 8A, 8B:
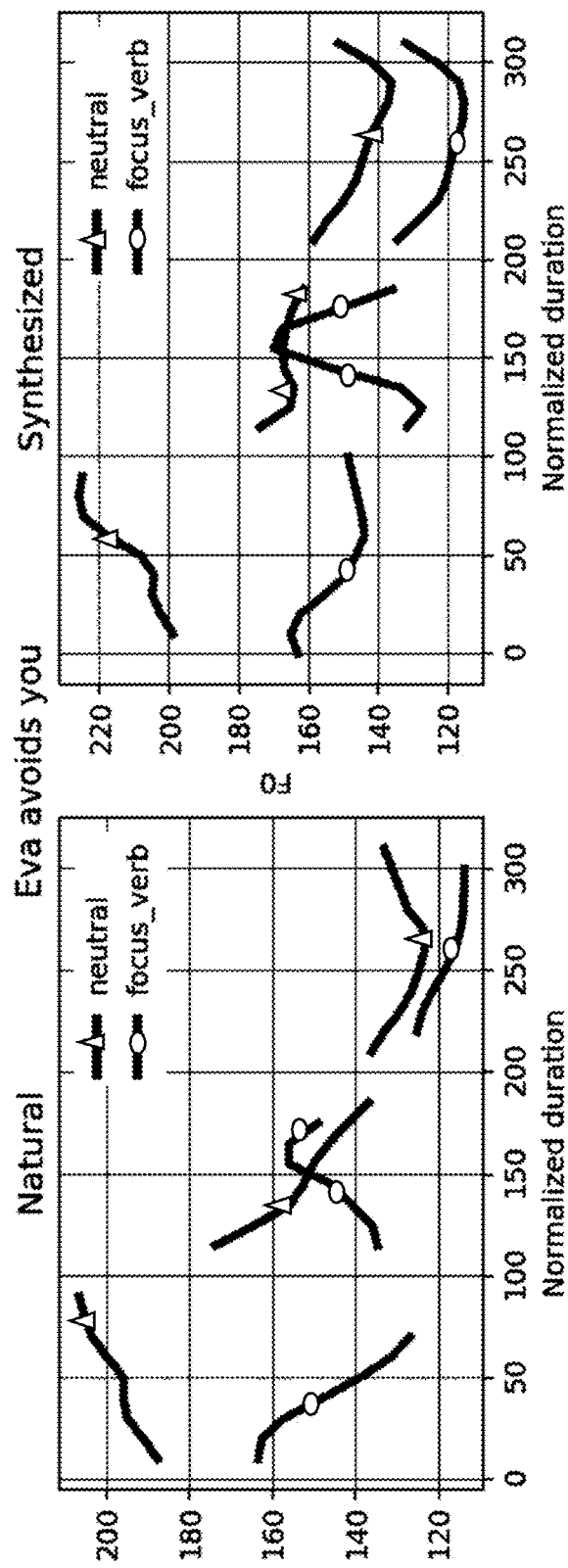
FIGS. 8A-8B shows a curve of a single utterance ('Eva avoids you') in natural (FIG. 8A) and synthesized (FIG. 8B) voice.

F0 Analysis: As seen in FIG. 7A, the natural speech shows a very distinct F0 curve for each instance type. In terms of difference, the prosodic curve for questions seems to be the most different from the others (neutral and focused). Between the three types of focus, the contrastive focus on verbs is the most distinct when compared to others in terms of F0. FIGS. 8A-8B shows a curve of a single utterance in natural (FIG. 8A) voice and synthesized (FIG. 8B) voice.

As shown in FIG. 7B, the synthetic speech seems to replicate these patterns relatively well. The diagonal shows a clear similarity of the pitch curves between the natural and synthetic speech. The overall patterns are also easily identifiable: synthetic questions were the most different, and between contrastive focus types the verb focus seemed the most distinct.

For finer-grained analysis, pitch curves in natural and synthetic voice are plotted in FIGS. 8A-8B. F0 pitch curve differences between two sentence types (neutral and focused_verb) in natural voice were also observed in the synthesized voice generated from the example model. In natural speech, focused words can realize a pitch accent or a rise-falling F0 movement, and a similar trend was observed for the verb 'avoids'.

Intensity analysis: FIGS. 7C-7D depict the intensity in dB of the natural and synthetic speech utterances. As for the natural speech, the neutral utterances and questions appeared to be the most similar in terms of intensity curves, and the focused sentences were clearly distinct from the other two. As shown in FIG. 7D, the example model tended to replicate the same overall patterns with clear differences in terms of intensity between neutral and questions versus focused.

Figure 9:
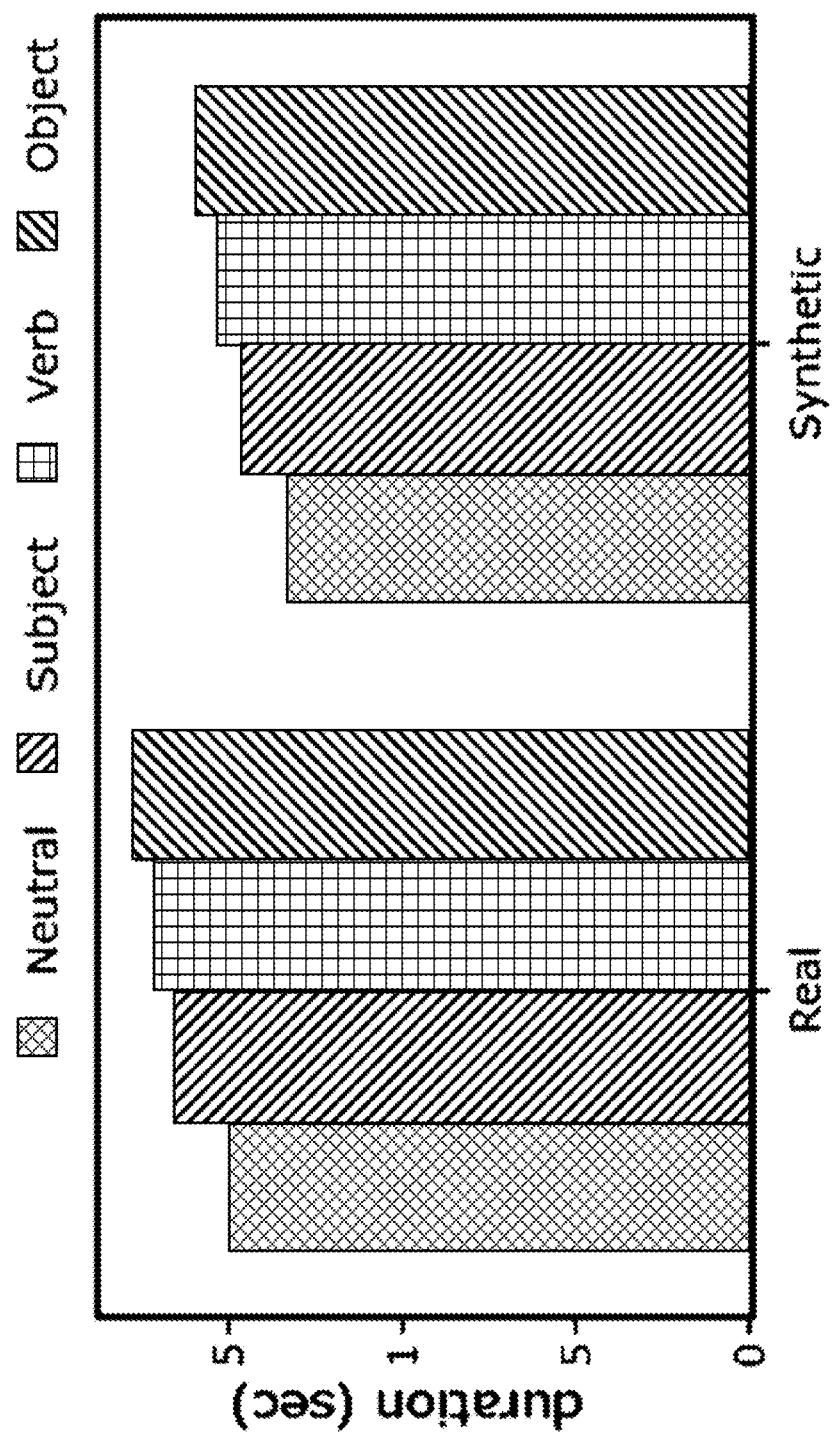
FIG. 9 shows a comparison of duration of sentences in both real and synthetic speech for neutral and focused sentences for subject, verb, and object cases.

Duration analysis: FIG. 9 plots the average duration of complete sentences in both real and synthetic speech for neutral, subject, verb, and object (from left to right in FIG. 9) focused cases. It can be observed that overall duration of focused sentences is longer than the neutral sentences in real and synthetic speech (which displays, however, shorter utterances in general). This may be due to the fact that natural utterances may contain silences at the beginning and end of the recordings.

Figure 10A:
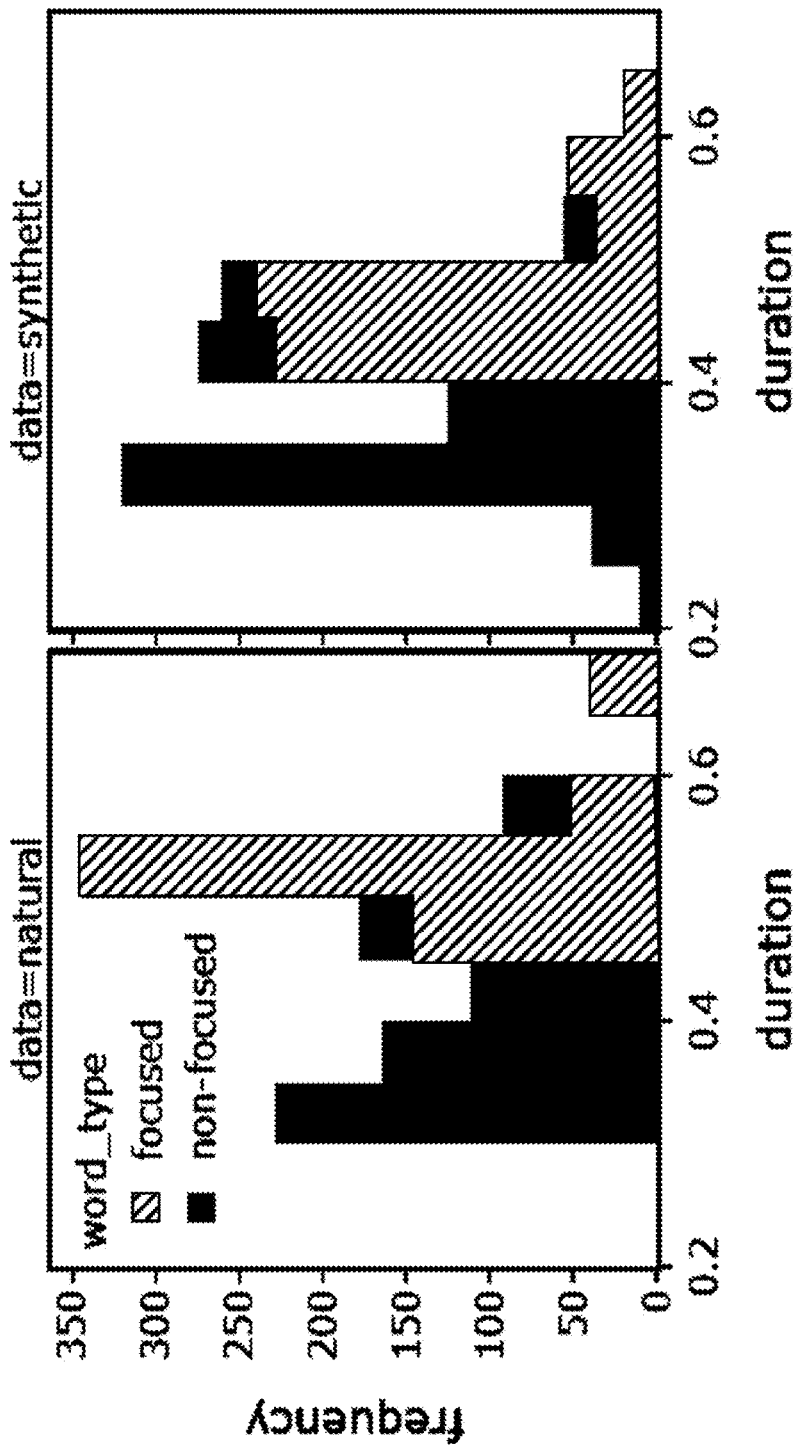
FIGS. 10A-10C shows distribution of word durations in natural (left) and synthetic (right) speech for utterances where contrastive focus is put on subject (FIG. 10A), verb (FIG. 10B) and object (FIG. 10C).
Figure 10B:
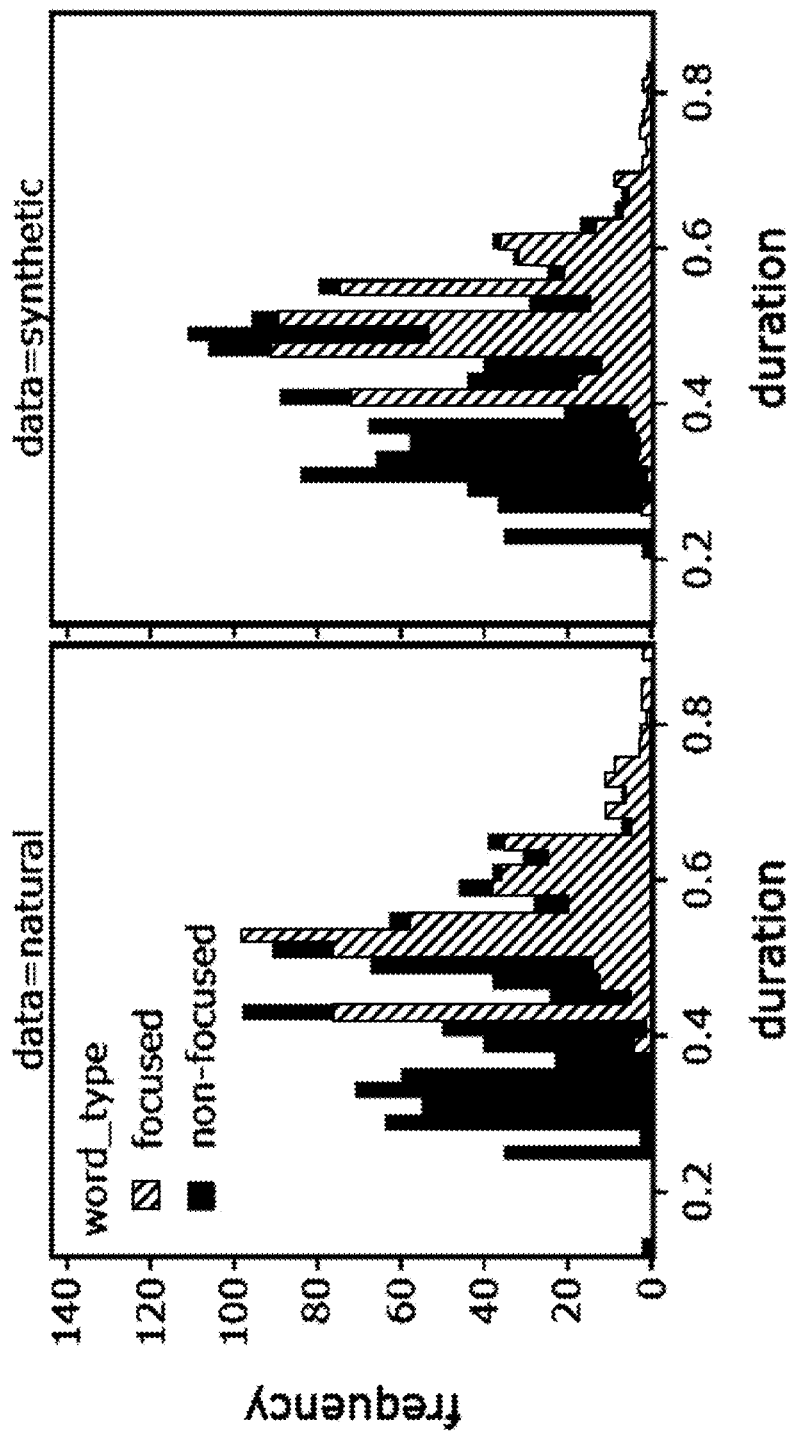
Figure 10C:
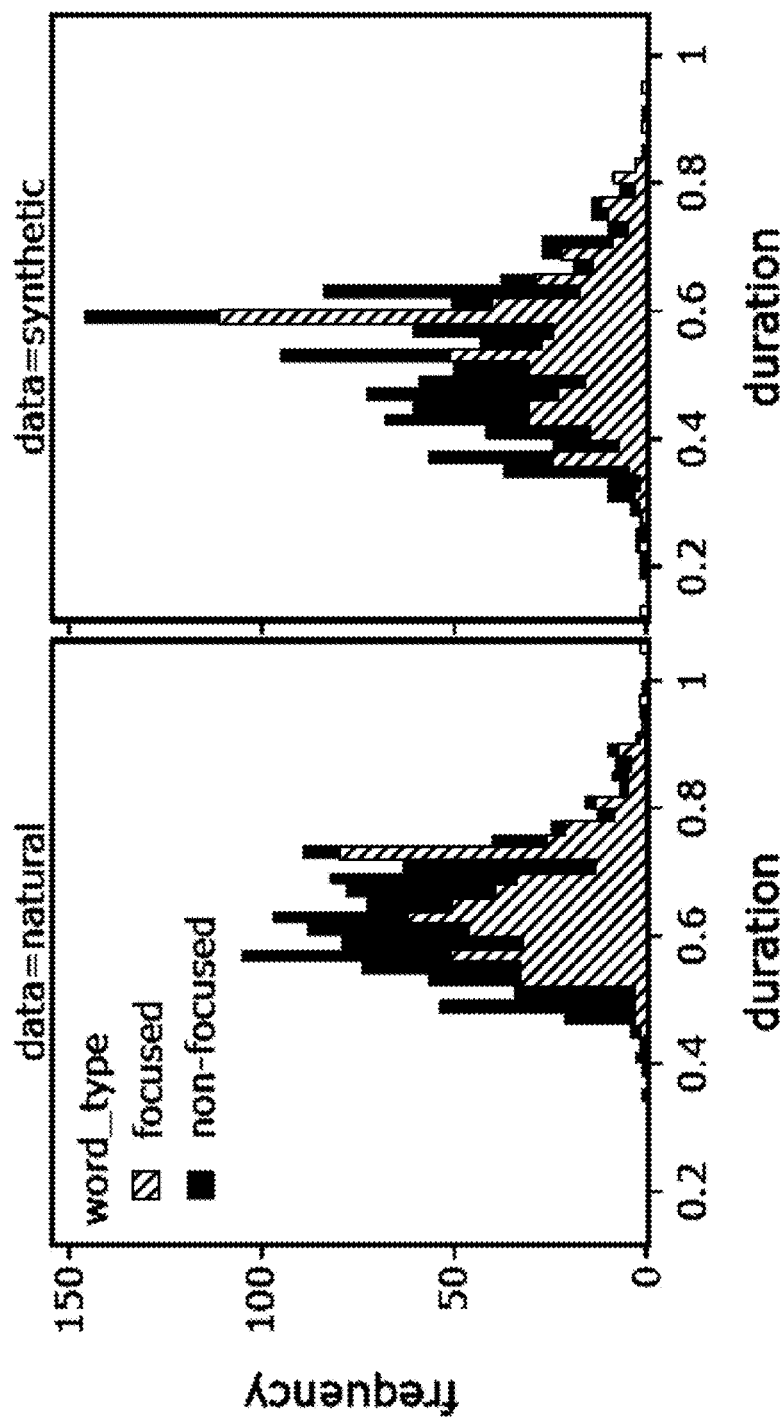

For more fine-grained analysis, Montreal Forced Aligner (McAuliffe et al., Montreal forced aligner: Trainable text-speech alignment using kaldi, Proc. Interspeech 2017, pages 498-5022, 2017) was used, and duration of words in both (natural and synthetic) validation sets (2950 utterances) was used. Distributions were plotted for focused words for subject, verb, and object, and these were compared to those of corresponding non-focused words as shown in FIGS. 10A-10C. There were less unique words for focus on subject, and therefore the distributions had wider bars in that case.

Results on natural speech confirmed that a speaker reliably marked focus location (subject, verb, or object) using longer duration. The duration difference is, however, less distinct when the focus is put on the object. Results on synthetic speech displayed similar contrast between focused and non-focused words, which demonstrated that the example model had learned to control duration of synthetic speech in order to put focus on a given word.

Figure 11:
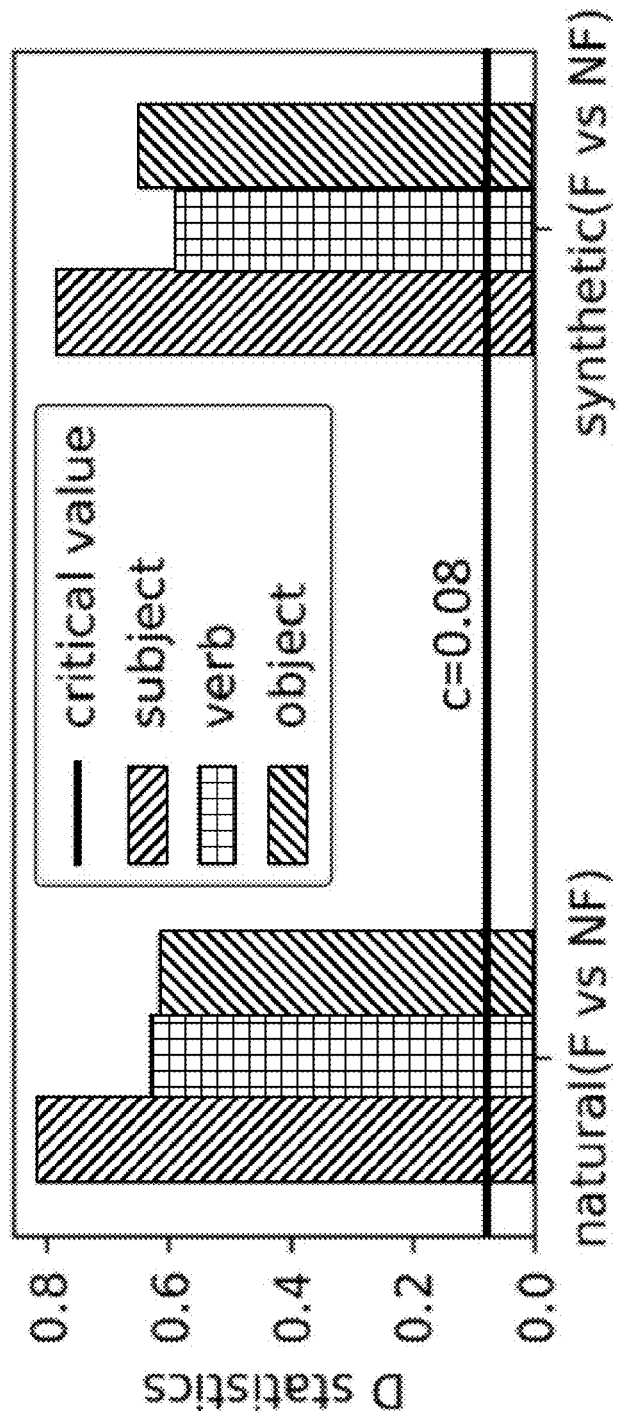
FIG. 11 is a graph illustrating statistical differences between word duration distributions for non-focused and focused words, using 2 samples Kolmogorov-Smirnov test, for natural speech (left) and synthetic speech (right).

Statistical analysis of these distributions was performed with 2 samples Kolmogorov-Smirnov test using α=0.05. Statistics D and critical value c are plotted in FIG. 11 (subject-verb-object shown left to right for both natural and synthetic). For distributions to be identical, D should be less than c. FIG. 11 shows that D values are greater than c and that non-focus and focus duration distributions were not identical for natural speech. A similar trend (and similar D levels) was observed for synthetic speech.

Neutral and focused sentences were also analyzed by inspecting the pauses in between words. The starting and ending pauses in all sentences were ignored. The detection in pauses was given by the Montreal Forced Aligner. For subject, the pauses after the focused word were counted. For object, pauses made before the focused word were counted. For verb, the pauses made before and after the focused word were counted. FIG. 12 compares those counts for focused or neutral sentences for both natural and synthetic speech. It was observed that focused sentences had more detected pauses compared to the neutral ones, and that the example TTS model was also able to reproduce this pattern in synthetic speech.

Varying amount of training data: To assess a generalization capacity of the example end-to-end TTS model, the model was trained with three alternative subsets of the data with, respectively, 0% of training data for focus_verb, 25%, and 50%. These variations were selected to determine whether the example model was able to generate focused words in positions it had not seen before (here, verb), and if not, how much data would be needed for the model to generalize.

Results for the F0 curves comparison are shown in FIGS. 13A-13C. The trend was similar for intensity and duration. As shown in FIG. 13A, without any training utterances containing focus_verb, the example TTS model had difficulties generalizing (e.g., $4^{th}$ line and column). While the example model was able to clearly differentiate with the questions, the fine-grained differences between focus words of different positions were not captured well. This was confirmed by a manual inspection performed on some examples: while the example model produced sometimes neutral sounding sentences, sometimes the focus was misplaced on another word and sometimes it was correct.

When the number of utterances containing this event was slightly increased (to 25% in FIG. 13B and to 50% in FIG. 13C), the example end-to-end TTS model was able to regain good performance and displayed the same similarity patterns as the ones that were observed with the full training set.

In general, example methods and systems tended to replicate the same overall patterns as natural speech, with clear differences in terms of intensity between neutral and questions versus contrastive focus. Results on synthetic speech displayed similar contrast between focused and non-focused words, which demonstrated that example models had learned to control duration in synthetic speech in order to simulate focus on a given word. Example systems were able to partly replicate natural speech characteristics.

Example training and prosody control methods for end-to-end TTS systems were thus demonstrated to encode fine-grained prosodic features such as contrastive focus and affirmative versus interrogative sentences. Example control tokens including local and global interpretable control tags inserted directly in the input sequences allowed example trained end-to-end TTS models to manipulate the generated prosody, including F0, intensity, pauses, and durations.

Though the experimental TTS system was trained using a mono-speaker corpus, example training methods can be expanded to multispeaker TTS systems. For instance, a general TTS model can be generated having as a base, a non-annotated dataset and, as extensions, one or more smaller corpora with specific prosodic annotations.

System Architecture

Figure 14:
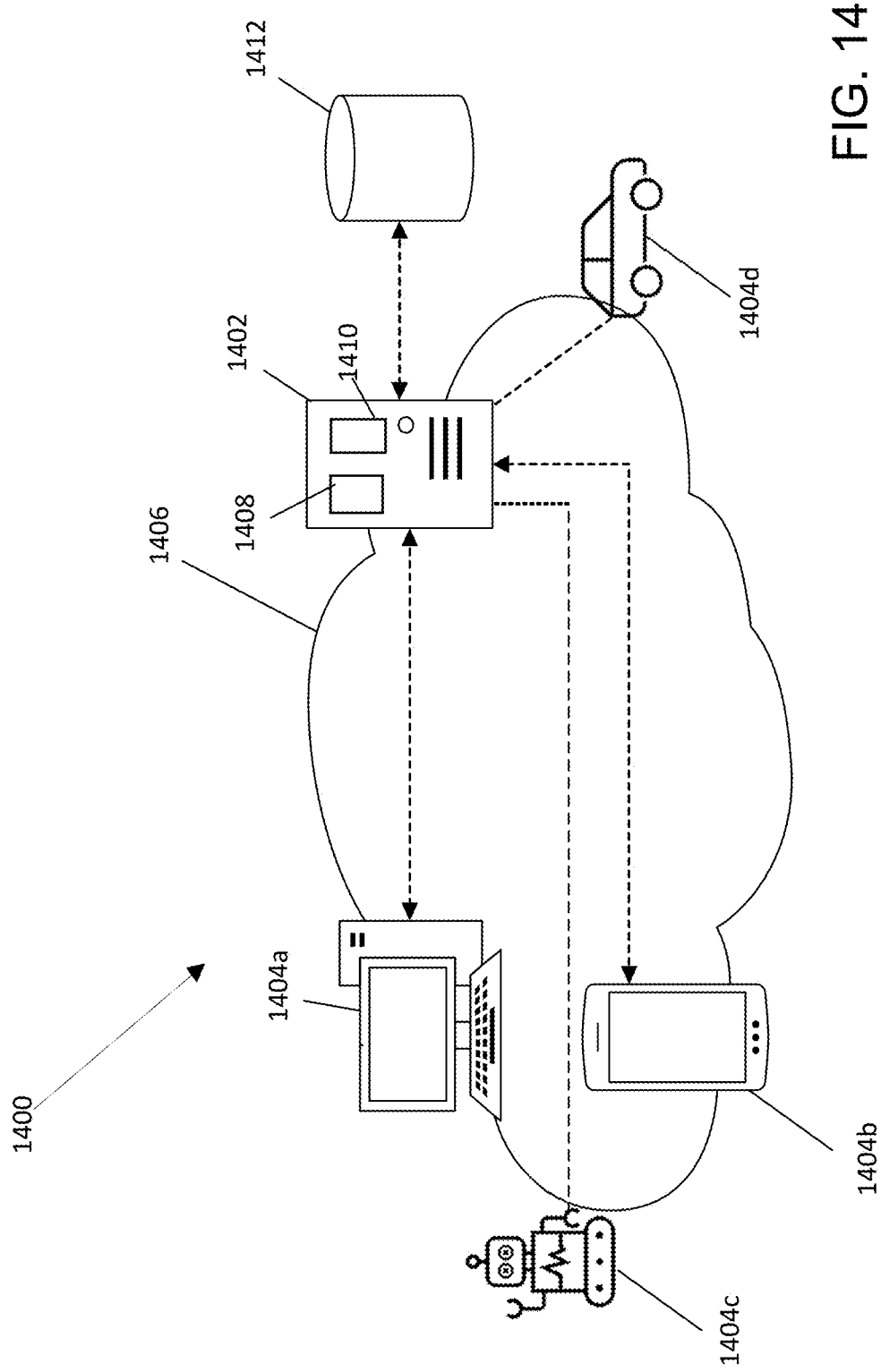
FIG. 14 shows an example network architecture in which one or more example methods may be performed.

Example systems, methods, and embodiments may be implemented within a system or network architecture 1400 such as the architecture illustrated in FIG. 14, which includes a server 1402 and one or more client devices 1404 that communicate over a network 1406 which may be wireless and/or wired, such as the Internet, for data exchange. The server 1402 and the client devices 1404 can each include a processor, e.g., processor 1408 and a memory, e.g., memory 1410 (shown by example in server 1402), such as but not limited to random-access memory (RAM), read-only memory (ROM), hard disks, solid state disks, or other non-volatile storage media. Memory 1410 may also be provided in whole or in part by external storage in communication with the processor 908.

The end-to-end TTS model 400 for instance, may be embodied in and/or implemented using the processor 1408 and memory 1410 or other processor and memory in the server 1402 and/or client devices 1404. It will be appreciated that the processor 1408 can include either a single processor or multiple processors operating in series or in parallel, and that the memory 1410 can include one or more memories, including combinations of memory types and/or locations. Server 1402 may also include, but are not limited to, dedicated servers, cloud-based servers, or a combination (e.g., shared). Storage, e.g., a database, may be embodied in suitable storage in the server 1402, client device 1404, a connected remote storage 1412 (shown in connection with the server 1402, but can likewise be connected to client devices), or any combination.

Client devices 1404 may be any processor-based device, terminal, etc., and/or may be embodied in a client application executable by a processor-based device, etc. Client devices may be disposed within the server 1402 and/or external to the server (local or remote, or any combination) and in communication with the server. Example client devices 1404 include, but are not limited to, autonomous computers 1404a, mobile communication devices (e.g., smartphones, tablet computers, etc.) 1404b, robot 1404c, autonomous vehicle 1404d, wearable devices, virtual reality, augmented reality, or mixed reality devices (not shown), or others. Client devices 1404 may be configured for sending data to and/or receiving data from the server 1402, and may include, but need not include, one or more output devices, such as but not limited to displays, printers, etc. for displaying or printing results of certain methods that are provided for display by the server. Client devices may include combinations of client devices.

In an example model generating, e.g., training or fine-tuning, method, the server 1402 or client devices 1404 may receive a dataset from any suitable source, e.g., from memory (as nonlimiting examples, internal storage, an internal database, etc.), from external (e.g., remote) storage 1412 connected locally or over the network 1406. The model to be trained, e.g., including one or more updateable parameters, can be provided, e.g., in memory 1410 and implemented, e.g., using a processor such as processor 1408 in communication with the memory. The example model generating method can generate a trained model, e.g., including one or more updated parameters, that can be likewise stored in the server (e.g., memory 1410), client devices 1404, external storage 1412, or combination. In some example embodiments provided herein, training and/or inference may be performed offline or online (e.g., at run time), in any combination. Results can be output (e.g., displayed, transmitted, provided for display, printed, etc.) and/or stored for retrieving and providing on request.

In an example training method, the server 1402 or client devices 1404 may receive a dataset including input text (pre-annotated, or initially without annotations and then annotated) and speech representations from any suitable source, e.g., by local or remote input from a suitable interface, or from another of the server or client devices connected locally or over the network 1406. Trained models such as the example neural TTS model can be likewise stored in the server (e.g., memory 1410), client devices 1404, external storage 1412, or combination. In some example embodiments provided herein, training and/or inference may be performed offline or online (e.g., at run time), in any combination.

In an example end-to-end TTS method during inference or runtime the server 1402 or client devices 1404 may receive input text from any suitable source, e.g., by local or remote input from a suitable interface (e.g., keyboard, mouse, stylus, touch pad, touch screen, microphone with speech-to-text processing, etc.), or from another of the server or client devices connected locally or over the network 1406 and process the input text using example neural models. The input text can be pre-annotated according to example methods, annotated after it is initially input, or a combination. Results of processing by the neural TTS model can be output (e.g., delivered as generated speech via an audio output (such as a speaker or other sound transducer, audio signal output (e.g., digital, or analog via a suitable D/A converter), sound processor or sound chip, etc.), provided (e.g., as a spectrogram or other speech signal) to a connected speech generator or synthesizer downstream for generating speech, transmitted, displayed, provided for display, printed, and/or stored for retrieving and providing on request.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one or more of the methods described herein when it is performed by a processor.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

General

Embodiments of the present invention provide, among other things, a computer implemented method for generating an end-to-end neural text-to-speech (TTS) model to process an input text to generate speech representations, the method comprising: inputting an annotated set of text documents into the TTS model stored in a memory, the annotated set of text documents including annotations inserted therein to indicate prosodic features; and training, using a processor, the TTS model using the annotated set of text documents and a corresponding dataset of speech representations of the text documents that include prosody associated with the indicated prosodic features; wherein the trained TTS model learns to associate the prosody with the annotations. In addition to any of the above features in this paragraph, the method may further comprise: annotating the text documents to provide the annotated set. In addition to any of the above features in this paragraph, for each of a plurality of groups of text documents in the annotated set, each text document in the group may be annotated to indicate prosodic features for a focus type selected among a set of focus types. In addition to any of the above features in this paragraph, each annotated text document may be paired with a speech representation of the text document that includes prosody associated with the indicated prosodic features for the text document. In addition to any of the above features in this paragraph, for each of a plurality of groups of text documents in the annotated set, each text document in the group may be annotated to indicate prosodic features for a focus type selected among a set of focus types; and each text document in the group may relate to a different focus type among the set of focus types. In addition to any of the above features in this paragraph, the set of focus types may comprise one or more of neutral (declarative) or no focus, question (interrogative) or broad focus, narrow or contrastive focus on subject, narrow or contrastive focus on verb, or narrow or contrastive focus on object. In addition to any of the above features in this paragraph, the prosody may provide contrast for one or more lexical and/or temporal units in the speech representation based on linguistic features in the input text. In addition to any of the above features in this paragraph, the prosody provides contrast for one or more lexical units in the speech representation based on the linguistic features in the input text, and each of the lexical units in the speech representation may comprise one or more utterances, words, chains of words, sub-words, or syllables. In addition to any of the above features in this paragraph, the linguistic features may comprise one or more of syntax, semantics, or pragmatics. In addition to any of the above features in this paragraph, for each of a plurality of groups of text documents in the annotated set, each text document in the group may be annotated to indicate prosodic features for a focus type selected among a set of focus types; the set of focus types comprises one or more of neutral (declarative) or no focus, question (interrogative) or broad focus, narrow or contrastive focus on subject, narrow or contrastive focus on verb, or narrow or contrastive focus on object; and the linguistic features may comprise focus on one or more portions of each text document in the group based on the focus types. In addition to any of the above features in this paragraph, the speech representations may comprise speech samples in the dataset. In addition to any of the above features in this paragraph, the speech samples in the dataset may be mono-speaker samples. In addition to any of the above features in this paragraph, the speech samples in the dataset may be multi-speaker samples. In addition to any of the above features in this paragraph, the speech samples in the dataset may be generated from human speech. In addition to any of the above features in this paragraph, the speech samples in the dataset may comprise synthetic speech. In addition to any of the above features in this paragraph, the annotated set of text documents in the group and the respectively paired speech representations may provide a group of text/audio pairs. In addition to any of the above features in this paragraph, for each of a plurality of groups of text documents in the annotated set, each text document in the group may be annotated to indicate prosodic features for a focus type selected among a set of focus types; and for each text/audio pair, each speech representation respectively may relate to a different focus type among the set of focus types. In addition to any of the above features in this paragraph, the dataset may comprise a plurality of the groups of text/audio pairs. In addition to any of the above features in this paragraph, each text document in a respective group may be identical to other text documents in the group other than the annotations. In addition to any of the above features in this paragraph, each text document in a respective group may be different from text documents in others of the plurality of groups. In addition to any of the above features in this paragraph, the annotations may comprise one or more of control tags (codes) or control tokens. In addition to any of the above features in this paragraph, for each of a plurality of groups of text documents in the annotated set, each text document in the group may be annotated to indicate prosodic features for a focus type selected among a set of focus types; the set of focus types may comprise a broad focus or a focus for all lexical units in the input text; and the annotation may comprise a global control token. In addition to any of the above features in this paragraph, for each of a plurality of groups of text documents in the annotated set, each text document in the group may be annotated to indicate prosodic features for a focus type selected among a set of focus types; the set of focus types may comprise a neutral (declarative) focus or no focus; and the annotation may be provided by an absence of control tokens. In addition to any of the above features in this paragraph, for each of a plurality of groups of text documents in the annotated set, each text document in the group may be annotated to indicate prosodic features for a focus type selected among a set of focus types; the set of focus types may comprise one or more of contrastive focus on subject, contrastive focus on verb, or contrastive focus on object, contrastive focus may emphasize one or more lexical units that are contrary to presuppositions of a speaker; and the annotation may comprise at least one local control token disposed proximate or immediately prior to lexical units in the subject, verb, or object. In addition to any of the above features in this paragraph, the method may further comprise removing, using a processor, one or more of capitalization or punctuation from the annotated set of text documents. In addition to any of the above features in this paragraph, the method may further comprise one or more of sampling or trimming the speech representations using a processor. In addition to any of the above features in this paragraph, the TTS model may comprise an autoregressive model. In addition to any of the above features in this paragraph, the TTS model may comprise a non-autoregressive model. In addition to any of the above features in this paragraph, the prosody may be represented by one or more prosodic attributes. In addition to any of the above features in this paragraph, the one or more prosodic attributes may comprise one or more of pitch, duration, rhythm, pause, or intensity (energy) of one or more spoken lexical units. In addition to any of the above features in this paragraph, the TTS model may comprise a sequence-to-sequence (seq2seq) model. In addition to any of the above features in this paragraph, the TTS model may comprise a transformer-based model. In addition to any of the above features in this paragraph, the TTS model may comprise an architecture in the memory including first and second feedforward transformer (FFTr) stacks; the first FFTr stack (encoder) may produce, using a processor, an output combining a hidden representation of the input text and a prediction for one or more prosodic attributes for each lexical unit of the input text, the prediction being generated by one or more prosodic attribute predictor modules; and the second FFTr stack (decoder) may produce, using a processor, a speech signal from the output of the first FFTr stack. In addition to any of the above features in this paragraph, each FFTr may comprise a convolutional layer, an activation layer, a dropout layer, and a normalization layer. In addition to any of the above features in this paragraph, each prosodic attribute predictor module may comprise a convolutional layer, an activation layer, a dropout layer, and a normalization layer. In addition to any of the above features in this paragraph, the speech representations may comprise a speech signal. In addition to any of the above features in this paragraph, the speech signal may comprise a spectrogram. In addition to any of the above features in this paragraph, the spectrogram is a Mel-spectrogram. In addition to any of the above features in this paragraph, the TTS model may be coupled to a speech synthesizer (vocoder) for generating speech from the produced speech signal. In addition to any of the above features in this paragraph, the TTS model may be trained using one or more updateable default training parameters. In addition to any of the above features in this paragraph, one or more of the text documents may comprise an answer to a question. In addition to any of the above features in this paragraph, the method may further comprise: annotating a new input text to indicate prosodic features; and inputting the annotated new input text to the trained TTS model; and the trained TTS model, using a processor, may process an input text and generate a speech output including prosody corresponding to annotations in the annotated new input text. In addition to any of the above features in this paragraph, the dataset may be annotated to indicate prosodic features for a focus type selected among a set of focus types; and the new input text may be annotated to indicate prosodic features for one or more of the focus types selected among the set of focus types.

According to additional embodiments, a computer implemented method for generating speech from text while controlling prosody of the generated speech may comprise: annotating, using a processor, a new input text to indicate prosodic features; and inputting, using a processor, the annotated new input text to a trained TTS model stored in a memory; the trained TTS model processing the annotated new input text and generating a speech output including prosody corresponding to annotations in the annotated new input text; wherein the trained TTS model is trained to learn to associate the prosody with the annotations by: inputting an annotated set of text documents into the TTS model; the annotated set of text documents including annotations inserted therein to indicate prosodic features; training, using a processor, the TTS model using the annotated set of text documents and a corresponding dataset of speech representations of the text documents that include prosody associated with the indicated prosodic features. In addition to any of the above features in this paragraph, the dataset may be annotated to indicate prosodic features for a focus type selected among a set of focus types; and the new input text may be annotated to indicate prosodic features for one or more of the focus types selected among the set of focus types.

According to additional embodiments, a computer implemented method for generating speech from text while controlling prosody of the generated speech, comprises: receiving, by a trained TTS model stored in a memory, an annotated new input text including annotations indicating prosodic features; generating, by the trained TTS model, a speech output including prosody corresponding to annotations in the annotated new input text; wherein the trained TTS model is trained to learn to associate the prosody with the annotations by: inputting an annotated set of text documents into the TTS model; the annotated set of text documents including annotations inserted therein to indicate prosodic features; training, using a processor, the TTS model using the annotated set of text documents and a corresponding dataset of speech representations of the text documents that include prosody associated with the indicated prosodic features.

According to additional embodiments, a processor-implemented neural text-to-speech (TTS) model stored in a memory for processing an input text to generate speech representations and to control prosody in the speech representations explicitly and directly from the input text may comprise: an encoder trained to process the input text including annotations indicating prosodic features in the input text; and a decoder trained to generate speech representations of the input text that include prosody associated with the annotations; wherein the TTS model is trained to associate the prosody with the annotations. In addition to any of the above features in this paragraph, the TTS model may comprise an autoregressive model. In addition to any of the above features in this paragraph, the TTS model may comprise a non-autoregressive model. In addition to any of the above features in this paragraph, the prosody may be represented by one or more prosodic attributes. In addition to any of the above features in this paragraph, the one or more prosodic attributes may comprise one or more of pitch, duration, rhythm, pause, or intensity (energy) of one or more spoken lexical units. In addition to any of the above features in this paragraph, the TTS model may comprise a sequence-to-sequence (seq2seq) model. In addition to any of the above features in this paragraph, the sequence-to-sequence (seq2seq) model may comprise an encoder-decoder model. In addition to any of the above features in this paragraph, the sequence-to-sequence (seq2seq) model may comprise a transformer-based model. In addition to any of the above features in this paragraph, the encoder may comprise a first feedforward transformer (FFTr) stack, the encoder being configured for producing an output combining a hidden representation of the input text and a prediction for one or more prosodic attributes for each lexical unit of the input text; and the decoder may comprise a second FFTr stack configured to produce a speech signal from the output of the first FFTr stack. In addition to any of the above features in this paragraph, the encoder may comprise one or more prosodic attribute predictor modules configured for predicting one or more prosodic attributes for each lexical unit of the input text. In addition to any of the above features in this paragraph, each FFTr may comprise: a convolutional layer; an activation layer; a dropout layer; and a normalization layer. In addition to any of the above features in this paragraph, each prosodic attribute predictor module may comprise: a convolutional layer; an activation layer; a dropout layer; and a normalization layer. In addition to any of the above features in this paragraph, the speech representations may comprise a speech signal. In addition to any of the above features in this paragraph, the speech signal may comprise a spectrogram. In addition to any of the above features in this paragraph, the TTS model may be coupled to a speech synthesizer (vocoder) for generating speech from the speech signal. In addition to any of the above features in this paragraph, the TTS model may be incorporated into a smart speaker. In addition to any of the above features in this paragraph, the TTS model may be incorporated into a neural speech-to-speech model. In addition to any of the above features in this paragraph, the neural speech-to-speech model may further comprise a speech encoder for generating the input text by processing an input speech signal. In addition to any of the above features in this paragraph, may further comprise a neural machine translation (NMT) model configured to generate the input text as an output sequence by translating an input sequence.

According to additional embodiments, a method for generating a corpus for training of a neural model to control prosody comprises: providing a seed comprising an initial set of documents; and expanding the seed using a language model in a memory to generate an expanded set of documents, the language model being trained using MLM methods, wherein said expanding may comprise masking different portions of each of the initial set of documents and using the language model to predict the masked portions, wherein the masked portions are selected based on their prosody for different focus types of the document among a set of focus types; for each of a plurality of groups of the expanded text documents, annotating, using a processor, each text document in the group to indicate prosodic features, wherein each text document in the group relates to a different focus type among the set of focus types, where the indicated prosodic features for each text document in the group relate to the respective focus type for that document; pairing, using a processor, each annotated text document in the group with a speech representation of the input text that includes prosody associated with the indicated prosodic features for the text document; and storing the annotated set of text documents and speech representations. In addition to any of the above features in this paragraph, the prosody may provide contrast for one or more lexical units in the input text based on linguistic features in the input text. In addition to any of the above features in this paragraph, each lexical unit may comprise one or more of documents, utterances, words, chains of words, sub-words, phonemes, or syllables. In addition to any of the above features in this paragraph, the linguistic features may comprise one or more of syntax, semantics, or pragmatics. In addition to any of the above features in this paragraph, the linguistic features may comprise focus on one or more of the portions of the text documents based on the focus types. In addition to any of the above features in this paragraph, the speech representations may comprise speech samples in the corpus. In addition to any of the above features in this paragraph, the speech samples in the dataset may be mono-speaker samples. In addition to any of the above features in this paragraph, the speech samples in the dataset may be multi-speaker samples. In addition to any of the above features in this paragraph, the speech samples in the dataset may be generated from human or synthetic speech. In addition to any of the above features in this paragraph, the annotated text documents in the group and the respectively paired speech representations may provide a group of text/audio pairs; for each text/audio pair, each speech representation respectively may relate to a different focus type among the set of focus types; and the corpus may comprise a plurality of the groups of text/audio pairs. In addition to any of the above features in this paragraph, each text document in a respective group may be identical to other text documents in the group other than the annotations; and each text document in a respective group may be different from text documents in others of the plurality of groups. In addition to any of the above features in this paragraph, the set of focus types may comprise one or more of neutral (declarative) or no focus, question (interrogative) or broad focus, narrow or contrastive focus on subject, narrow or contrastive focus on verb, or narrow or contrastive focus on object. In addition to any of the above features in this paragraph, the annotations may comprise one or more of control tags or control tokens. In addition to any of the above features in this paragraph, the set of focus types may comprise broad focus (focus for all lexical units in the input text), and the annotated may comprise a global control tag. In addition to any of the above features in this paragraph, the set of focus types may comprise neutral (declarative), and the annotation may be provided by an absence of control tags. In addition to any of the above features in this paragraph, the set of focus types may comprise one or more of contrastive focus on subject, contrastive focus on verb, or contrastive focus on object, and the annotation may comprise one or more local control tags disposed proximate to or immediately prior to lexical units in the subject, verb, or object. In addition to any of the above features in this paragraph, the annotation may further comprise removing one or more of capitalization or punctuation from the text documents. In addition to any of the above features in this paragraph, generating the speech representations may comprise presenting the document to a human speaker via an interface with an annotation indicating a focus among the set of focuses; and the annotation may comprise one or more of punctuation, capitalization, or a tag.

According to additional embodiments, an apparatus for processing an input text to generate speech representations comprises a non-transitory computer-readable medium having executable instructions stored thereon for causing a processor and a memory to: receive the input text, wherein the input text is annotated using control tokens to indicate prosodic features; generating, using a neural text-to-speech (TTS) model in the memory, speech representations of the received input text that include prosody associated with the annotations; and outputting the generated speech representation as a speech signal; wherein the neural TTS model is trained to associate the prosody with the annotations.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure. All documents cited herein are hereby incorporated by reference in their entirety, without an admission that any of these documents constitute prior art.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general-purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A computer implemented method for generating a neural text-to-speech (TTS) model, the method comprising:
inputting an annotated set of text documents into the TTS model stored in a memory, the annotated set of text documents including annotations inserted therein to indicate prosodic features, wherein, for each of a plurality of groups of text documents in the annotated set, each text document in the group is annotated to indicate prosodic features based on syntactic, semantic, and/or pragmatic features of the text document, wherein the prosodic features are for a focus type selected among a set of focus types, and wherein the annotations comprise control tags and/or control tokens;
training, using a processor, the TTS model using the annotated set of text documents and a corresponding dataset of speech representations of the text documents that include prosody associated with the indicated prosodic features, wherein the prosody comprises pitch, duration, rhythm, pause, and/or intensity of one or more documents, utterances, words, chains of words, sub-words, phonemes, and/or syllables;

wherein the trained TTS model learns to associate the prosody with the annotations;

wherein the trained TTS model processes an input text to generate speech signals, and a speech synthesizer generates speech from the produced speech signals.

2. The method of claim 1,
wherein each text document in the group relates to a different focus type among the set of focus types.

3. The method of claim 2, wherein the set of focus types comprises one or more of neutral (declarative) or no focus, question (interrogative) or broad focus, narrow or contrastive focus on subject, narrow or contrastive focus on verb, or narrow or contrastive focus on object.

4. The method of claim 1, wherein the prosody provides contrast for one or more lexical units in the speech representation based on linguistic features in the input text; wherein the linguistic features comprise one or more of syntax, semantics, or pragmatics; and wherein each of the lexical units in the speech representation comprises one or more utterances, words, sub-words, syllables, or phonemes.

5. The method of claim 1,
wherein the linguistic features comprise focus on one or more portions of each text document in the group based on the focus types.

6. The method of claim 1, wherein the speech representations comprise speech samples in the dataset;
wherein the annotated set of text documents in the group and the respectively paired speech representations provide a group of text/audio pairs;
and
wherein, for each text/audio pair, each speech representation respectively relates to a different focus type among the set of focus types.

7. The method of claim 1,
wherein the set of focus types comprises a broad focus or a focus for all lexical units in the input text; and
wherein the annotation comprises a global control token.

8. The method of claim 1,
wherein the set of focus types comprises a neutral (declarative) focus or no focus; and
wherein the annotation is provided by an absence of control tokens.

9. The method of claim 1,
wherein the set of focus types comprises one or more of contrastive focus on subject, contrastive focus on verb, or contrastive focus on object, wherein contrastive focus emphasizes one or more lexical units that are contrary to presuppositions of a speaker; and
wherein the annotation comprises at least one local control token disposed proximate or immediately prior to lexical units in the subject, verb, or object.

10. The method of claim 1, wherein the method further comprises:
removing, using a processor, one or more of capitalization or punctuation from the annotated set of text documents; and
one or more of sampling or trimming the speech representations using a processor.

11. The method of claim 1, wherein the TTS model comprises an autoregressive model.

12. The method of claim 1, wherein the prosody is represented by one or more prosodic attributes; and wherein the one or more prosodic attributes comprise one or more of pitch, duration, rhythm, pause, or intensity (energy) of one or more spoken lexical units.

13. The method of claim 1, wherein the TTS model comprises a sequence-to-sequence (seq2seq) model; wherein the TTS model comprises a transformer-based model; and wherein the TTS model comprises an architecture in the memory including first and second feedforward transformer (FFTr) stacks;
wherein the first FFTr stack (encoder) produces, using a processor, an output combining a hidden representation of the input text and a prediction for one or more prosodic attributes for each lexical unit of the input text, the prediction being generated by one or more prosodic attribute predictor modules; and
wherein the second FFTr stack (decoder) produces, using a processor, a speech signal from the output of the first FFTr stack.

14. The method of claim 13, wherein each FFTr comprises a convolutional layer, an activation layer, a dropout layer, and a normalization layer.

15. The method of claim 13, wherein each prosodic attribute predictor module comprises a convolutional layer, an activation layer, a dropout layer, and a normalization layer.

16. The method of claim 1, wherein the speech representations comprise a spectrogram.

17. The method of claim 1, wherein the speech representations comprise a speech signal; and wherein the speech synthesizer comprises a vocoder.

18. A processor-implemented neural text-to-speech (TTS) model stored in a memory for processing an input text to generate speech representations and to control prosody in the speech representations explicitly and directly from the input text, the model comprising:
an encoder trained to process the input text including annotations indicating prosodic features in the input text based on syntactic, semantic, and/or pragmatic features of the input text, wherein the prosodic features are for a focus type selected among a set of focus types, wherein the annotations comprise control tags and/or control tokens; and
a decoder trained to generate speech signals for the input text that include prosody associated with the annotations, wherein the prosody comprises pitch, duration, rhythm, pause, and/or intensity of one or more documents, utterances, words, chains of words, sub-words, phonemes, and/or syllables;
wherein the TTS model is trained to associate the prosody with the annotations; and
wherein a speech synthesizer generates speech from the speech signals.

19. The processor-implemented model of claim 18, wherein the TTS model comprises an autoregressive model.

20. The processor-implemented model of claim 18, wherein the TTS model comprises a non-autoregressive model.

21. The processor-implemented model of claim 18, wherein the TTS model comprises a transformer-based model.

22. The processor-implemented model of claim 21, wherein the encoder comprises a first feedforward transformer (FFTr) stack, the encoder being configured for producing an output combining a hidden representation of the input text and a prediction for one or more prosodic attributes for each lexical unit of the input text; and
wherein the decoder comprises a second FFTr stack configured to produce a speech signal from the output of the first FFTr stack.

23. The processor-implemented model of claim 22, wherein the encoder comprises one or more prosodic attribute predictor modules configured for predicting one or more prosodic attributes for each lexical unit of the input text.

24. The processor-implemented model of claim 23, wherein each FFTr and each prosodic attribute predictor module comprises:
a convolutional layer;
an activation layer;
a dropout layer; and
a normalization layer.

25. The processor-implemented model of claim 18, wherein the speech representations comprise a speech signal.

26. The processor-implemented model of claim 25, wherein the speech signal comprises a spectrogram.

27. The processor-implemented model of claim 25, wherein the TTS model is coupled to a speech synthesizer (vocoder) for generating speech from the speech signal.

28. The processor-implemented model of claim 18, wherein the TTS model is incorporated into a smart speaker.

29. The processor-implemented model of claim 18, wherein the TTS model is incorporated into a neural speech-to-speech model comprising a speech encoder for generating the input text by processing an input speech signal.

30. The processor-implemented model of claim 18, further comprising:
a neural machine translation (NMT) model configured to generate the input text as an output sequence by translating an input sequence.

31. A method for generating a corpus for training of a neural model to control prosody, the method comprising:
providing a seed comprising an initial set of documents; and
expanding, using a processor, the seed using a language model in a memory to generate an expanded set of documents, the language model being trained using a masked language model (MLM) method wherein said expanding comprises masking different portions of each of the initial set of documents and using the language model to predict the masked portions, wherein the masked portions are selected based on their prosody for different focus types of the document among a set of focus types;
for each of a plurality of groups of the expanded text documents, annotating, using a processor, each text document in the group to indicate prosodic features, wherein each text document in the group relates to a different focus type among the set of focus types, where the indicated prosodic features for each text document in the group relate to the respective focus type for that document;
pairing, using a processor, each annotated text document in the group with a speech representation of the input text that includes prosody associated with the indicated prosodic features for the text document, the speech representation comprising recorded human speech signals, wherein the prosody comprises pitch, duration, rhythm, pause, and/or intensity of one or more documents, utterances, words, chains of words, sub-words, phonemes, and/or syllables; and
storing the annotated text documents and speech representations.

32. The method of claim 31, wherein the prosody provides contrast for one or more lexical units in the input text based on linguistic features in the input text;
wherein each lexical unit comprises one or more of documents, utterances, words, chains of words, sub-words, phonemes, or syllables; and
wherein the linguistic features comprise one or more of syntax, semantics, or pragmatics.

33. The method of claim 31, the annotated text documents in the group and the respectively paired speech representations provide a group of text/audio pairs;
wherein, for each text/audio pair, each speech representation respectively relates to a different focus type among the set of focus types; and
wherein the corpus comprises a plurality of the groups of text/audio pairs.

34. The method of claim 31, wherein the annotations comprise one or more of control tags or control tokens.

35. The method of claim 34, wherein the annotation further comprises: removing one or more of capitalization or punctuation from the text documents.

36. A computer implemented method for generating speech from text while controlling prosody of the generated speech, comprising:
receiving, by a trained TTS model stored in a memory, an annotated new input text including annotations indicating prosodic features based on syntactic, semantic, and/or pragmatic features of the new input text, wherein the annotations comprise control tags and/or control tokens, and wherein the annotations indicate prosodic features for a focus type selected among a set of focus types;
generating, by the trained TTS model, speech signals including prosody corresponding to annotations in the annotated new input text, wherein the prosody comprises pitch, duration, rhythm, pause, and/or intensity of one or more documents, utterances, words, chains of words, sub-words, phonemes, and/or syllables; and
generating speech from the speech signals using a speech synthesizer;
wherein the trained TTS model is trained to learn to associate the prosody with the annotations by:
inputting an annotated set of text documents into the TTS model; the annotated set of text documents including annotations inserted therein to indicate prosodic features, wherein the annotations comprise control tags and/or control tokens, and wherein the annotations indicate prosodic features for a focus type selected among a set of focus types;
training, using a processor, the TTS model using the annotated set of text documents and a corresponding dataset of speech representations of the text documents that include prosody associated with the indicated prosodic features.

* * * * *